US012621019B1

(12) United States Patent
Harjani et al.

(10) Patent No.: US 12,621,019 B1
(45) Date of Patent: May 5, 2026

(54) FAST HOPPING CORRELATOR-BASED TRANSCEIVER

(71) Applicant: Regents of the University of Minnesota, Minneapolis, MN (US)

(72) Inventors: Ramesh Harjani, Minneapolis, MN (US); Seyednaser Mousavi, Minneapolis, MN (US); Zhiheng Wang, St Paul, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 2014 days.

(21) Appl. No.: 16/602,808

(22) Filed: Aug. 30, 2019

Related U.S. Application Data

(60) Provisional application No. 62/725,912, filed on Aug. 31, 2018.

(51) Int. Cl.
  H04B 1/715 (2011.01)
  H04B 1/7136 (2011.01)

(52) U.S. Cl.
  CPC ........... H04B 1/715 (2013.01); H04B 1/7136 (2013.01); *H04B 2001/7152* (2013.01)

(58) Field of Classification Search
  CPC ....... H04B 1/713; H04B 1/715; H04B 1/7136
  See application file for complete search history.

(56) References Cited

U.S. PATENT DOCUMENTS

| 3,649,821 A | 3/1972 | Gumacos |
| 4,839,842 A | 6/1989 | Pyi et al. |

| 5,198,779 A | 3/1993 | Bruton |
| 5,412,588 A | 5/1995 | Shiraishi |
| 5,701,393 A | 12/1997 | Smith, III et al. |
| 6,526,101 B1 | 2/2003 | Patel |
| 9,948,315 B2 | 4/2018 | Dempsey |

(Continued)

OTHER PUBLICATIONS

Cabric et al., "Wireless Field Trial Results of a High Hopping Rate FHSS-FSK Testbed," IEEE Journal on Selected Areas in Communications, vol. 23, No. 5, May 2005, 10 pp.

(Continued)

*Primary Examiner* — Rahel Guarino
(74) *Attorney, Agent, or Firm* — Shumaker & Sieffert, P.A.

(57) ABSTRACT

An example frequency hopping transceiver includes one or more antennas, a transmitter digital oscillator, transmitter correlation circuitry, a receiver digital oscillator, and receiver correlation circuitry. The transmitter correlation circuitry is communicatively coupled to the transmitter digital oscillator and to the antennas, and is configured to spread, based on transmitter oscillation signals, transmit signals over transmit channels to create frequency-hopped transmit signals that are provided to the antennas. The receiver correlation circuitry is communicatively coupled to the receiver digital oscillator and to the antennas, and is configured to: de-spread the frequency-hopped data signals; spread, based on the receiver oscillation signals, one or more narrow-band interference signals included in received signals over a group of receive channels to create frequency-hopped interference signals, where the receive channels are orthogonal to the transmit channels; and filter out the frequency-hopped interference signals from the de-spread data signals.

20 Claims, 19 Drawing Sheets

(56) References Cited

U.S. PATENT DOCUMENTS

| | | | |
|---|---|---|---|
| 10,972,123 | B1 | 4/2021 | Hughes et al. |
| 2005/0013386 | A1* | 1/2005 | Ojard .................... H04B 1/719 |
| | | | 375/316 |

OTHER PUBLICATIONS

Zhang et al., "An Integrated CMOS Passive Self-Interference Mitigation Technique for FDD Radios," IEEE Journal of Solid-State Circuits, vol. 50, No. 5, May 2015, 13 pp.

Ghaffari et al., "Tunable High-Q N-Path Band-Pass Filters: Modeling and Verification," IEEE Journal of Solid-State Circuits, vol. 46, No. 5, May 2011, 13 pp.

Lu et al., "A High-Quality Analog Oscillator Using Oversampling D/A Conversion Techniques," IEEE Transactions on Circuits and Systems—II: Analog and Digital Signal Processing, vol. 41, No. 7, Jul. 1994, 8 pp.

Al-Shammary et al., "Code Selective Filters in CMOS Processes for Full Duplex Communication and Interference Mitigation," GMOACTech, Mar. 2018, 5 pp.

Hancock, "Signal Processing at RF (SPAR)," DARPA, Defense Advanced Research Projects Agency, accessed from https://www.darpa.mil/program/signal-processing-at-rf, accessed on Mar. 26, 2020, 1 pp.

"MAAP-010168," Macom Technology Solutions, Inc., accessed from https://cdn.macom.com/datasheets/MAAP-010168.pdf, accessed on Mar. 26, 2020, 9 pp.

Geng et al., "An 11-Bit 8.6 GHz Direct Digital Synthesizer MMIC With 10-Bit Segmented Sine-Weighted DAC," IEEE Journal of Solid-State Circuits, vol. 45, No. 2, Feb. 2010, 14 pp.

Razavi, "A Study of Phase Noise in CMOS Oscillators," IEEE Journal of Solid-State Circuits, vol. 31, No. 3, Mar. 1996, 13 pp.

Cho et al., "A 60 kb/s-10 Mb/s Adaptive Frequency Hopping Transceiver for Interference-Resilient Body Channel Communication," IEEE Journal of Solid-State Circuits, vol. 44, No. 3, Mar. 2009, 10 pp.

Peng et al., "High-Performance Frequency-Hopping Transmitters Using Two-Point Delta-Sigma Modulation," IEEE Transactions on Microwave Theory and Techniques, vol. 52, No. 11, Nov. 2004, 7 pp.

Mousavi et al., "A 0.4-1.0 GHz, 47 MHop/s Frequency-Hopped TXR Front End With 20 dB In-Band Blocker Rejection," IEEE Journal of Solid-State Circuits, May 22, 2019, 12 pp.

Harjani et al., "An Ultra-Fast Hopping Correlator-Based Transceiver with In-Band Jammer Resistance and Multi-Path Resilience," Proceedings of GOMAC, Mar. 12-15, 2018, 4 pp.

Kalia et al., "A Simple, Unified Phase Noise Model for Injection-Locked Oscillators," IEEE Radio Frequency Integrated Circuits Symposium, Jun. 2011, 4 pp.

Harjani et al., "Ultra-Fast Frequency Hopped Transceivers," ICECS Bordeaux, University of Minnesota, Dec. 2018, 29 pp.

Harjani et al., "System Tradeoffs in Ultra-Fast Frequency Hopped Tranceivers," GOMACTech, Mar. 27, 2019, 31 pp.

Harjani et al., "System Tradeoffs in Ultra-Fast Frequency Hopped Transceivers," GOMACTech, Mar. 25, 2019, 4 pp.

Harjani et al., "An Ultra-Fast Hopping Correlator-Based Transceiver with In-Band Jammer Resistance and Multi-Path Resilience," GOMACTech-2018, Mar. 14, 2018, 37 pp.

Mousavi et al., "A 0.4-1.0GHZ, 47MHop/S Frequency Hopped TXR Front-End With 20dB In-Band Blocker Rejection," Institute of Electrical and Electronic Engineers (IEEE) 44th European Solid State Circuits Conference (ESSCIRC 2018), Dresden, Germany, Sep. 3-5, 2018.

Razavi et al., "Inter-N and Fractional-N Synthesizers," Electrical Engineering Department of the University of California, Los Angeles, Oct. 2014, 26 pp.

Lanka et al., "Frequency-Hopped Quadrature Frequency Synthesizer in 0.13-um Technology," IEEE Journal of Solid-State Circuits, vol. 46, No. 9, Sep. 2011, 12 pp.

Yang et al., "Multiferroic Thin Film Circulator with Unable Bandpass Behavior," USNC-URSI Radio Science Meeting (Joint with AP-S Symposium), Jul. 2014.

Omer et al., "A PA-Noise Cancellation Technique for Next Generation Highly Integrated RF Front-Ends," IEEE Radio Frequency Integrated Circuits Symposium, Jun. 2012, 4 pp.

Van de Sande et al., "A 7.2 GSa/s, 14 Bit or 12 GSa/s, 12 Bit Signal Generator on a Chip in a 165 GHz fT BiCMOS Process," IEEE Journal of Solid-State Circuits, vol. 47, No. 4, Apr. 2012, 10 pp.

Min et al., "An All-CMOS Architecture for a Low-Power Frequency-Hopped 900 MHz Spread Spectrum Transceiver," IEEE 1994 Custom Integrated Circuits Conference, 4 pp.

Agrawal et al., "A 0.3 GHz to 1.4 GHz N-path Mixer-based Code-Domain RX with TX Self-Interference Rejection," 2017 IEEE Radio Frequency Integrated Circuits Symposium, Jun. 2017, 4 pp.

Hill et al., "A 30.9 dBm, 300 MHz 45-nm SOI CMOS Power Modulator for Spread-Spectrum Signal Processing at the Antenna," 2018 IEEE/MTT-S International Microwave Symposium, Jun. 2018, 4 pp.

Agrawal et al., "An Interferer-Tolerant CMOS Code-Domain Receiver Based on N-Path Filters," IEEE Journal of Solid-State Circuits, vol. 53, No. 5, May 2018, 11 pp.

Ghaffari et al., "8-Path Tunable RF Notch Filters for Blocker Suppression," Proc. IEEE International Solid-State Circuits Conference, Feb. 2012, 3 pp.

Kargaran et al., "Low Power Wideband Receiver with RF Self-Interference Cancellation for Full-Duplex and FDD Wireless Diversity," 2017 IEEE Radio Frequency Integrated Circuits Symposium (RFIC), Jun. 2017, 4 pp.

Yeoh et al., "A 1.3-GHz 350-mW Hybrid Direct Digital Frequency Synthesizer in 90-nm CMOS," IEEE Journal of Solid- State Circuits, vol. 45, No. 9, Sep. 2010, 11 pp.

Zhou et al., "A 12-Bit Nonlinear DAC for Direct Digital Frequency Synthesis," IEEE Transactions on Circuits and Systems—I: Regular Papers, vol. 55, No. 9, Oct. 2008, 10 pp.

Geng et al., "24-Bit 5.0 GHz Direct Digital Synthesizer RFIC With Direct Digital Modulations in 0.13 um SiGe BiCMOS Technology," IEEE Journal of Solid-State Circuits, vol. 45, No. 5, May 2010, 11 pp.

Yu et al., "A 12 GHz 1.9 W Direct Digital Synthesizer MMIC Implemented in 0.18 um SiGe BICMOS Technology," IEEE Journal of Solid-State Circuits, vol. 43, No. 6, Jun. 2008, 10 pp.

Nosaka et al., "A Low-Power Direct Digital Synthesizer Using a Self-Adjusting Phase-Interpolation Technique," IEEE Journal of Solid-State Circuits, vol. 36, No. 8, Aug. 2001, 5 pp.

Song et al., "A 14-b Direct Digital Frequency Synthesizer With Sigma-Delta Noise Shaping," IEEE Journal of Solid-State Circuits, vol. 39, No. 5, May 2004, 5 pp.

Dai et al., "A Direct Digital Frequency Synthesizer With Fourth-Order Phase Domain Noise Shaper and 12-bit Current-Steering DAC," IEEE Journal of Solid-State Circuits, vol. 41, No. 4, Apr. 2006, 12 pp.

De Caro et al., "A 380 MHz Direct Digital Synthesizer/Mixer With Hybrid CORDIC Architecture in 0.25 um CMOS," IEEE Journal of Solid-State Circuits, vol. 42, No. 1, Jan. 2007, 10 pp.

Tan et al., "An 800-MHz Quadrature Digital Synthesizer with ECL-Compatible Output Drivers in 0.8 um CMOS," IEEE Journal of Solid-State Circuits, vol. 30, No. 12, Dec. 1995, 3 pp.

Yoo et al., "A 2 GHz 130 mW Direct-Digital Frequency Synthesizer With a Nonlinear DAC in 55 nm CMOS," IEEE Journal of Solid-State Circuits, vol. 49, No. 12, Dec. 2014, 14 pp.

Alonso et al., "A 7GS/s Direct Digital Frequency Synthesizer with a Two-Times Interleaved RDAC in 65nm CMOS," Proc. 43rd IEEE European Solid State Circuits Conference, Sep. 2017, 4 pp.

Yang et al., "Optimized Design of N-Phase Passive Mixer-First Receivers in Wideband Operation," IEEE Transactions on Circuits and Systems—I: Regular Papers, vol. 62, No. 11, Nov. 2015, 12 pp.

Lien et al., "A High-Linearity CMOS Receiver Achieving +44dBm IIP3 and +13dBm B1dB for SAW-Less LTE Radio," IEEE Int. Solid-State Circuits Conference (ISSCC) Digital Technology Papers, Feb. 2017, 3 pp.

(56) References Cited

OTHER PUBLICATIONS

AlShammary et al., "A λ/4-Inverted N-path Filter in 45-nm CMOS SOI for Transmit Rejection with Code Selective Filters," IEEE/ MTT-S International Microwave Symposium, Jun. 2018, 4 pp.

Lanka et al., "Understanding the Transient Behavior of Injection Locked LC Oscillators," IEEE 2007 Custom Integrated Circuits Conference (CICC), September 207, 4 pp.

Felstead, "Follower Jammer Considerations for Frequency Hopped Spread Spectrum," IEEE Communications Conference, Applicant points out, in accordance with MPEP 609.04(a), that the year of publication, 1988, is sufficiently earlier than the effective U.S. filing date, so that the particular month of publication is not in issue, 5 pp.

U.S. Appl. No. 16/602,810, by Regents of the University of Minnesota (Inventors: Wang et al.), filed Aug. 30, 2019.

* cited by examiner

FAST HOPPING CORRELATOR-BASED TRANSCEIVER

This application claims the benefit of U.S. Provisional Application No. 62/725,912 filed Aug. 31, 2018, which is incorporated herein by reference in its entirety.

GOVERNMENT INTEREST

This invention was made with government support under HR0011-17-2-0001 awarded by the Defense Advanced Research Projects Agency (DARPA). The government has certain rights in the invention.

TECHNICAL FIELD

The present disclosure relates to antenna systems.

BACKGROUND

In-band resilience with respect to jamming or interference signals is an area of concern for proper operations of certain equipment, such as, e.g., military communication equipment. In a simple receiver coupled to an antenna, for example, many in-band jammers can easily saturate or, at the very least, limit the receiver gain of the receiver, resulting in significant communication link degradation due to decreased signal-to-interference-plus-noise ratio (SINR). As a countermeasure, frequency hopping has traditionally been used to improve robustness of a communication link by regularly changing the frequency of operation and avoiding jammers at a particular frequency.

SUMMARY

The present disclosure describes techniques for implementing an ultra-fast hopping, correlator-based spread spectrum transceiver that enables in-band rejection of jamming or interference signals in frequency hopping systems. These techniques may provide, e.g., 20 dB of processing gain at radio frequencies, while enabling a receiver front-end to suppress any in-band interference by, e.g., 20 dB. The disclosed transceiver circuitry includes passive mixers and agile oscillator/digital-to-analog converter engines that are capable of quickly moving in the frequency domain with very low power. An achieved hopping speed of, e.g., 47 Mhops/second is orders of magnitude faster than prior frequency-hopping systems. The disclosed transceiver may prevent in-band blocking (e.g., jamming) signals from jamming the receiver, and may also make it harder for jamming systems to follow the frequency hopping system, which may be very useful for, e.g., secure military applications, radar applications, and mobile communication systems, to name a few non-limiting examples. Multiple blockers can be suppressed without potentially any a priori knowledge of their frequency content. The disclosed techniques may also eliminate multi-path propagation effect in wireless channels.

In one example, a frequency hopping transceiver includes one or more antennas, a transmitter digital oscillator, transmitter correlation circuitry, a receiver digital oscillator, and receiver correlation circuitry. The one or more antennas are configured to receive and transmit wireless signals. The transmitter digital oscillator is configured to provide transmitter oscillation signals at one or more frequencies as a function of a transmit hopping code. The transmitter correlation circuitry is communicatively coupled to the transmitter digital oscillator and to the one or more antennas, and is configured to spread, based on the transmitter oscillation signals, one or more transmit signals over a plurality of transmit channels to create frequency-hopped transmit signals that are provided to the one or more antennas. The receiver digital oscillator is configured to provide receiver oscillation signals at one or more frequencies as a function of a receive hopping code, where the receive hopping code is orthogonal to the transmit hopping code. The receiver correlation circuitry is communicatively coupled to the receiver digital oscillator and to the one or more antennas, and is configured to: de-spread one or more frequency-hopped data signals included in incoming wireless signals received by the one or more antennas, wherein the incoming wireless signals further include one or more narrow-band interference signals; spread, based on the receiver oscillation signals, the one or more narrow-band interference signals over a plurality of receive channels to create frequency-hopped interference signals, wherein the receive channels are orthogonal to the transmit channels; and filter out the frequency-hopped interference signals from the de-spread data signals.

In one example, a method of providing in-band rejection of interference signals includes receiving, by one or more antennas, incoming wireless signals that include one or more frequency-hopped data signals and one or more narrow-band interference signals, providing, by a receiver digital oscillator, receiver oscillation signals at one or more frequencies as a function of a receive hopping code, and receiving, by receiver correlation circuitry that is communicatively coupled to the receiver digital oscillator and to the one or more antennas, the receiver oscillation signals provided by the receiver digital oscillator. The example method further includes de-spreading the one or more frequency-hopped data signals, spreading, based on the receiver oscillation signals, the one or more narrow-band interference signals over a plurality of receive channels to create frequency-hopped interference signals, and filtering out the frequency-hopped interference signals from the de-spread data signals.

In one example, a frequency hopping receiver includes one or more antennas, a receiver digital oscillator, and receiver oscillation circuitry. The one or more antennas are configured to receive incoming wireless signals that include one or more frequency-hopped data signals and one or more narrow-band interference signals. The receiver digital oscillator is configured to provide receiver oscillation signals at one or more frequencies as a function of a receive hopping code. The receiver correlation circuitry is communicatively coupled to the receiver digital oscillator and to the one or more antennas. The receiver correlation circuitry is configured to: de-spread the one or more frequency-hopped data signals; spread, based on the receiver oscillation signals, the one or more narrow-band interference signals over a plurality of receive channels to create frequency-hopped interference signals; and filter out the frequency-hopped interference signals from the de-spread data signals.

In one example, a frequency hopping transmitter includes one or more antennas, a transmitter digital oscillator, and transmitter oscillation circuitry. The one or more antennas are configured to transmit outgoing wireless signals. The transmitter digital oscillator is configured to provide transmitter oscillation signals at one or more frequencies as a function of a transmit hopping code. The transmitter correlation circuitry is communicatively coupled to the transmitter digital oscillator and to the one or more antennas, and is configured to: receive the transmitter oscillation signals provided by the transmitter digital oscillator; and spread, based on the transmitter oscillation signals, one or more transmit signals over a plurality of transmit channels to create frequency-hopped transmit signals, wherein the frequency-hopped transmit signals are included in the outgoing wireless signals for transmission by the one or more antennas.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
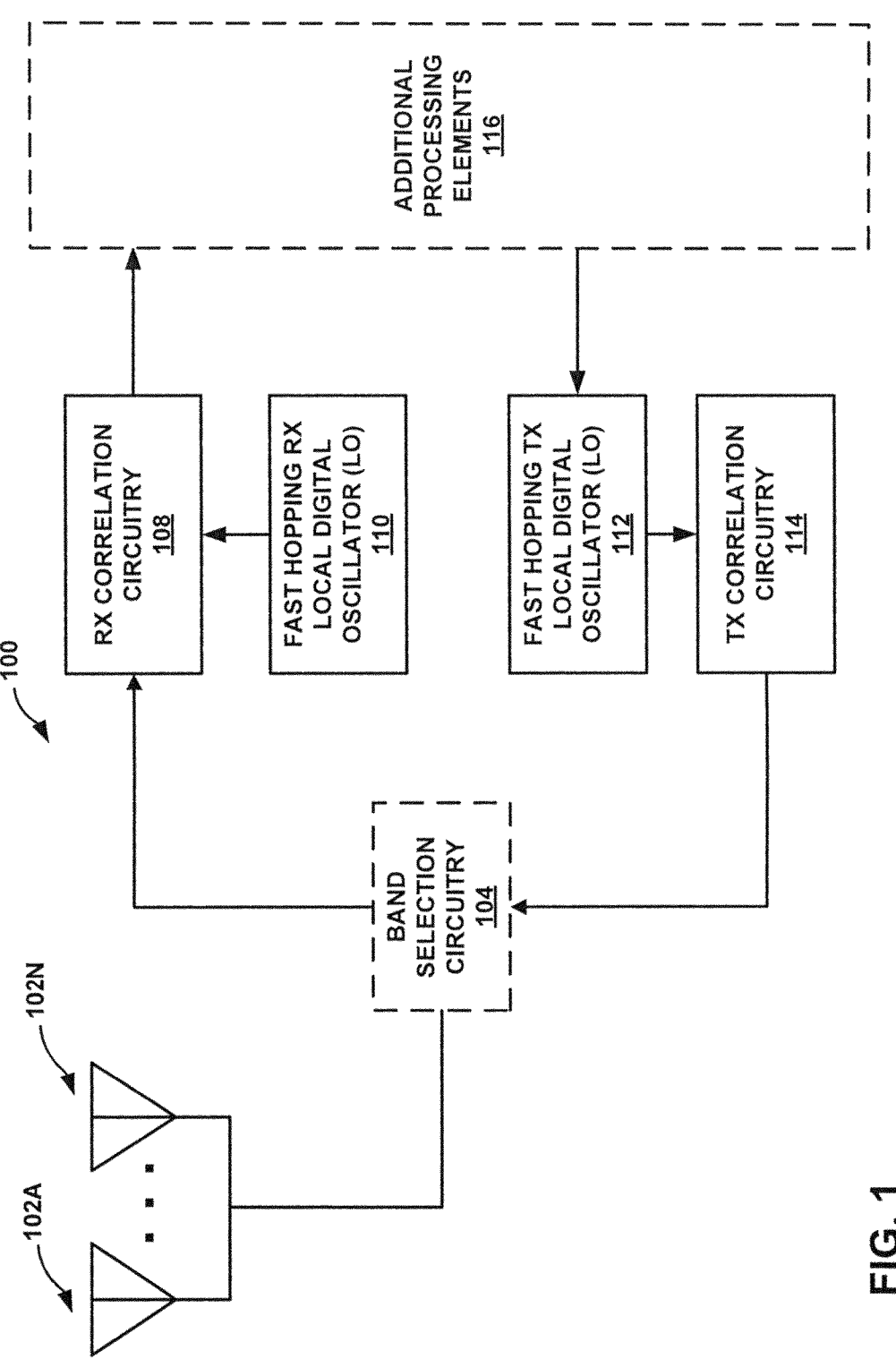
FIG. 1 is a block diagram illustrating an example frequency hopping transceiver, in accordance with one or more aspects of the present disclosure.

As noted above, in a simple receiver system, for example, many in-band jammers can easily saturate or, at the very least, limit the receiver gain of the receiver, resulting in significant communication link degradation due to decreased signal-to-interference-plus-noise ratio (SINR). As a countermeasure, frequency hopping has traditionally been used to improve robustness of the communication link by regularly changing the frequency of operation and avoiding jammers at a particular frequency. However, this approach typically requires blocker identification to continue communications. Additionally, any in-band blocker may eventually end up jamming the active front-end circuits.

In typical frequency hopped systems, the hop-rate is much slower than the symbol rate. Thus, in the presence of a jammer, several symbols are often affected before the transceiver switches to a new frequency. In prior systems, the fastest hopping rate has traditionally been one symbol per hop. However, with the increase in the hoping rate above one hop/symbol, the impact of the jammer can be decreased through the processing gain realized due to the jammer spreading over a bandwidth larger than the original bandwidth. Frequency hopping schemes have the capability of suppressing in-band jammers if a single symbol is spread over multiple hops. Unfortunately, this has traditionally not been possible due to the limited transient response of phase-locked loops (PLL's). In particular, the transient response of PLL's from one frequency to another is typically limited by the filter loop bandwidth. Given a loop bandwidth that is ¹/₁₀th of the input reference frequency, and approximating the settling time as four time constants, the maximum hop-rate for a 30 MHz input reference frequency PLL would be limited to 75 kHops/S. Thus, hardware realizations of high-hopping rate transceivers have proved to be quite challenging due to the limited transient response of PLL's. The hopping speed can be increased by utilizing a direct digital synthesis (DDS) for the local oscillator (LO). However, these designs are very power hungry. Direct sequence spread spectrum techniques are usually implemented in form of bulky acoustic front-end correlators that are used for in-band jammer rejection, and these may suffer from high insertion loss.

N-path band-stop filters have sometimes been used to suppress in-band blockers. However, these filters suffer from poor linearity and limited jammer rejection, and they also require a priori knowledge of the exact location of the blocker in the frequency domain, thus requiring power hungry spectrum sensing techniques. Additionally, these circuits become power hungry and complex with multiple LO's, one for each jammer, when attempting to suppress multiple blockers at the same time. Furthermore, as they operate in-band, they need to have a very small bandwidth so as to avoid reducing the usable bandwidth for the spectrum. Narrowband N-path notch filters require extremely large on-chip area.

The present disclosure describes techniques for implementing an ultra-fast hopping correlator-based spread spectrum transceiver that enables, e.g., analog/radio-frequency domain, in-band rejection of jamming or interference signals for frequency hopping systems, which may provide, e.g., 20 dB of processing gain at radio frequencies, while enabling the receiver front-end to suppress any in-band interference by, e.g., 20 dB. The circuitry includes passive mixers and agile oscillator/digital-to-analog converter engines that are capable of quickly moving in the frequency domain with very low power. The hopping speed of, e.g., 47 Mhops/seconds is orders of magnitude faster than prior frequency-hopping systems.

In certain examples, this architecture enables a receiver front-end to suppress any in-band interference by, e.g., 20 dB before signals arrive at a low-noise amplifier (LNA). A transient hop time of, e.g., 1.5 ns may be achieved in this design. As one non-limiting example, the front-end implemented in 65 nm CMOS technology occupies an active area of 3.1 mm², and consumes 24 mW ($=P_{TX}=P_{RX}$) from a 1V power supply for a center frequency of 1 GHz.

The disclosed transceiver may prevent in-band blocking (e.g., jamming) signals from jamming the receiver, and may also make it harder for jammers to follow the frequecy hopping system, which may be very useful for, e.g., secure military applications, radar applications, and mobile communication systems, to name a few non-limiting examples. Utilizing low-power ultrafast circuit architectures, multiple blockers can be suppressed without any a priori knowledge of their frequency content. Out-of-band blockers can be canceled using other on/off chip techniques, including well-known on/off chip techniques. The disclosed techniques may also eliminate or mitigate multi-path propagation effect in wireless channels.

In certain non-limiting examples, the system spreads each symbol into 100 channels to provide 20 dB of processing gain for the signal that suppresses the jammer by the same amount. In these non-limiting examples, a single channel's bandwidth is 0.6 MHz for a total band of 60 MHz. The transmitter and receiver co-exist in the same 60 MHz band but may not operate on the same channel frequencies. In other examples, any number of different channels N could be used, where N is a positive integer number. For example, if the number of channels equals 10, a processing gain of 10 dB may be achieved.

It is noted that any and all specific parameters, numbers, operating conditions, or other values (e.g., channels, frequencies, hopping rates, gains, etc.), which may be recited herein, are included as non-limiting examples, for purposes of illustration only. Any number of different parameters, numbers, operating conditions, or other values may be used in alternate examples, and are fully within the scope of the claims.

FIG. 1 is a block diagram illustrating an example frequency hopping transceiver 100, in accordance with one or more aspects of the present disclosure. In the example of FIG. 1, transceiver 100 includes one or more antennas 102A-102N (collectively, "antennas 102"), a fast hopping transmitter (TX) local digital oscillator (DO) 112, transmitter correlation circuitry 114, a fast hopping receiver (RX) local digital oscillator (DO) 110, and receiver correlation circuitry 108. Transceiver 100 may, in some cases, optionally include band selection circuitry 104 and one or more additional processing elements 116 (e.g., processing or computing systems, processors, processing circuitry) for processing incoming wireless signals and/or outgoing wireless signals for transmission via transceiver 100.

Antennas 102 are configured to receive and transmit wireless signals. For example, antennas 102 may receive incoming wireless signals that are transmitted by external devices, and may also transmit outgoing wireless signals that are generated by transceiver 100 and/or processing elements 116. Incoming wireless signals received by antennas 102 may include one or more frequency-hopped data signals and, in certain cases, one or more narrow-band interference (e.g., jamming) signals.

Transmitter digital oscillator 112 may be configured to provide transmitter oscillation signals at one or more frequencies as a function of a transmit hopping code, as described in further detail below. Transmitter correlation circuitry 114 is communicatively coupled to transmitter digital oscillator 112 and to antennas 102. Transmitter correlation circuitry 114 is configured to spread, based on the transmitter oscillation signals received from transmitter digital oscillator 112, one or more transmit signals over a plurality of transmit channels to create frequency-hopped transmit signals that are provided to antennas 102. The transmit signals may be provided by additional processing elements 116 of transceiver 100.

Receiver digital oscillator 110 is configured to provide receiver oscillation signals at one or more frequencies as a function of a receive hopping code, where the receive hopping code is orthogonal to the transmit hopping code, as described in further detail below. Receiver correlation circuitry 108 is communicatively coupled to receiver digital oscillator 110 and to antennas 102. Receiver correlation circuitry 108 is configured to de-spread one or more of the frequency-hopped data signals included in the incoming wireless signals received via antennas 102. Receiver correlation circuitry 108 is also configured to spread, based on the receiver oscillation signals from receiver digital oscillator 110, the one or more narrow-band interference signals over a plurality of receive channels to create frequency-hopped interference signals. The receive channels are orthogonal to the transmit channels. The receive channels and transmit channels may comprise radio-frequency channels. Receiver correlation circuitry 108 is further configured to filter out the frequency-hopped interference signals from the de-spread data signals. The de-spread data signals may be output or otherwise provided to additional processing elements 116 for further processing by transceiver 100.

In some non-limiting examples, the plurality of transmit channels and the plurality of receive channels comprise a total of 100 channels, where each of the 100 channels has a bandwidth of 0.6 Mhz, and where the 100 channels collectively provide a bandwidth of 60 Mhz. Optional band selection circuitry 104 may be communicatively coupled to antennas 102, and may be configured to suppress at least a portion of out-of-band interference outside of the 60 Mhz bandwidth. These values are included for purposes of illustration only. Various other values may be used in other examples. For instance, any number of different channels N could be used, where N is a positive integer number. For example, if the number of channels equals 10, a processing gain of, e.g., 10 dB may be achieved. Each channel may provide a defined amount of bandwidth.

Receiver correlation circuitry 108 may be configured to de-spread the one or more frequency-hopped data signals at least by providing a processing gain (e.g., 20 dB) to the one or more frequency-hopped data signals.

In some examples, the one or more narrow-band interference signals comprise one or more in-band jamming signals, and receiver correlation circuitry 108 is configured to filter out the frequency-hopped interference signals at least by suppressing the one or more in-band jamming signals by 20 dB.

As will be described in further detail below, such as shown, e.g., in the example of FIGS. 5A-5C, transmitter digital oscillator 112 may include transmission digital oscillation circuitry that includes exactly one digital multiplier, exactly one digital adder, and exactly two registers, the transmit hopping code being provided as input to the exactly one digital multiplier of the transmission digital oscillation circuitry. The transmitter digital oscillator may provide the transmitter oscillation signals at the one or more frequencies centered around fst/4 based on the transmit hopping code, where fst is a sampling clock frequency for the transmission digital oscillation circuitry. In various examples, the output frequency of the digital oscillator can range anywhere between 0 to fst/2, as a function of the transmit hopping code. Receiver digital oscillator 110 may also include receiver digital oscillation circuitry that includes exactly one digital multiplier, exactly one digital adder, and exactly two registers, the receive hopping code being provided as input to the exactly one digital multiplier of the receiver digital oscillation circuitry. The receiver digital oscillator may provide the receiver oscillation signals at the one or more frequencies centered around fsr/4 based on the receive hopping code, where fsr is a sampling clock frequency for the receiver digital oscillation circuitry. In various examples, the output frequency of the digital oscillator can range anywhere between 0 to fsr/2, as a function of the receiver hopping code. The transmission digital oscillation circuitry and the receiver digital oscillation circuitry may be each associated with a transfer function $z^{-2}+r_2z^{-1}+1=0$, wherein $r_2$ represents the respective transmit or receive hopping code, and wherein $z^{-1}$ and $z^{-2}$ represent respective z transforms.

In some examples, transceiver 100 further includes a first digital-to-analog converter (DAC) that is configured to convert the transmitter oscillation signals from transmitter digital oscillator 112 into transmitter analog oscillation signals, and a second DAC that is configured to convert the receiver oscillation signals from receiver digital oscillator 110 into receiver analog oscillation signals. Transceiver 100 may further include a first injection-locked oscillator communicatively coupled to the first DAC, and a second injection-locked oscillator communicatively coupled to the second DAC. The first injection-locked oscillator functions as a first bandpass filter with respect to the transmitter analog oscillation signals. The second injection-locked oscillator functions as a second bandpass filter with respect to the receiver analog oscillation signals.

In some examples, receiver correlation circuitry 108 and receiver digital oscillator 110 are configured to provide a hopping rate of 47 Mhops/second and to enable 100 hops/ symbol for symbols included in the one or more frequency-hopped data signals. Transmitter correlation circuitry 114 and transmitter digital oscillator 112 are configured to provide a hopping rate of 47 Mhops/second and to enable 100 hops/symbol for symbols included in the one or more transmit signals. Receiver correlation circuitry 108 may comprise first N-path, switch-capacitor circuitry, and transmitter correlation circuitry 114 may comprise second N-path switch-capacitor circuitry.

In some examples, techniques described herein may provide a receiver-only system, which may include antennas 102, receiver correlation circuitry 108, receiver digital oscillator 110, and, optionally, one or more additional processing elements 116. In some examples, techniques described herein may provide a transmitter-only system, which may include antennas 102, transmitter correlation circuitry 114, transmitter digital oscillator 112, and, optionally, one or more additional processing elements 116.

Figure 2A:
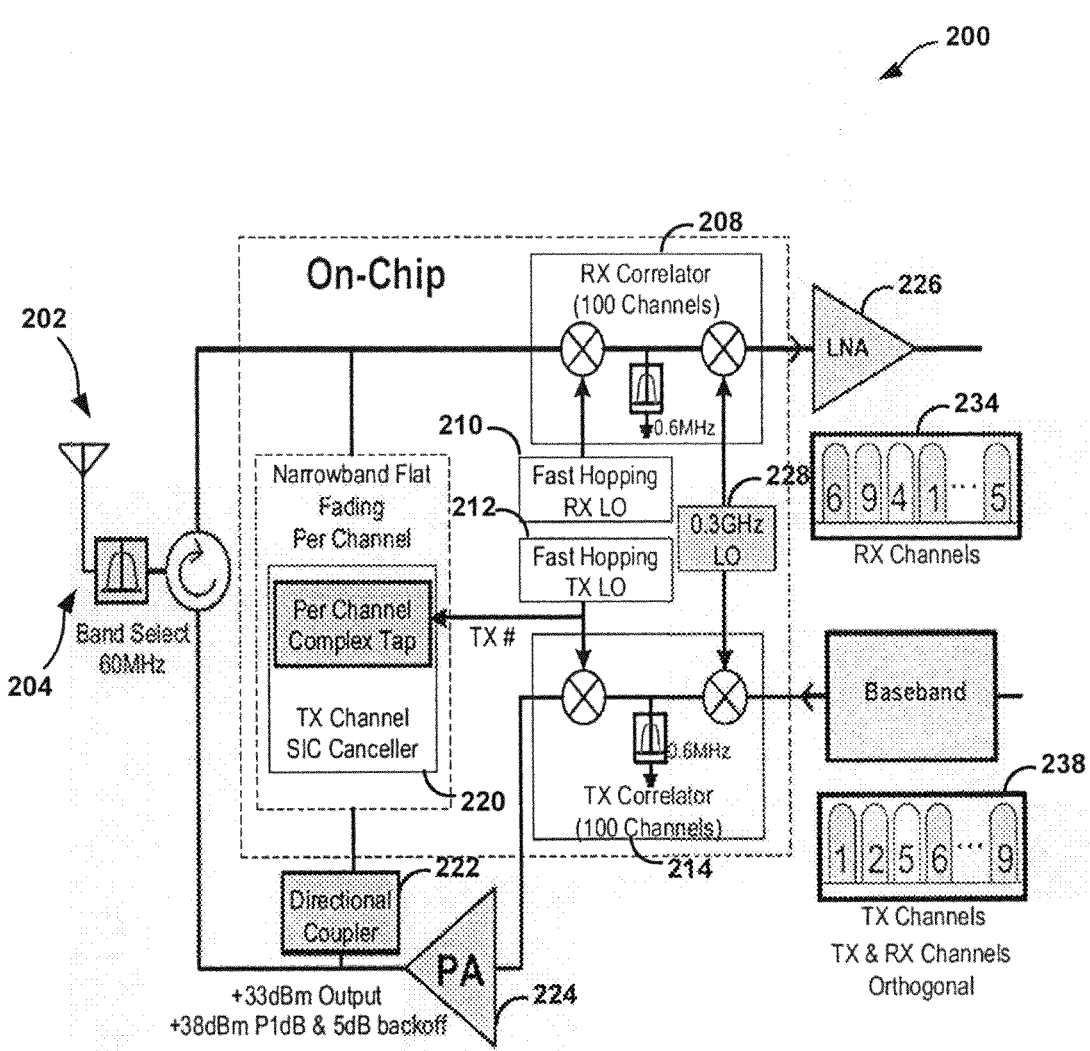
FIGS. 2A-2C are diagrams illustrating one example of a frequency hopping transceiver and corresponding circuitry information, in accordance with one or more aspects of the present disclosure.

In some examples, such as shown in FIG. 2A, transceiver 100 may further include a power amplifier communicatively coupled transmitter correlation circuitry 114, where the power amplifier is configured to amplify the frequency-hopped transmit signals that are transmitted by the one or more antennas 102. Transceiver 100 may also include self-interference cancellation circuitry that is communicatively coupled to transmitter correlation circuitry 114 via the power amplifier and also to receiver correlation circuitry 108. The self-interference cancellation circuitry is configured to suppress transmit channel interference on one or more channels of the plurality of transmit channels at least by performing narrow-band flat fading per each of the one or more channels. In some cases, transceiver 100 may include a directional coupler that is communicatively coupled to the power amplifier and to the self-interference cancellation circuitry, and an analog-to-digital converter communicatively coupled to the directional coupler, where the analog-to-digital converter is included in an auxiliary path that is configured to suppress broadband noise signals that are output from the power amplifier.

In some examples, transceiver 100 further includes a separate a 0.3 GHz digital local oscillator communicatively coupled to receiver correlation circuitry 108 and to transmitter correlation circuitry 114. The 0.3 GHz digital local oscillator is configured to provide an offset to each of the one or more transmit signals and to the de-spread one or more frequency-hopped data signals. Transceiver 100 may also include a low-noise amplifier that is communicatively coupled to receiver correlation circuitry 108.

A non-limiting example of transceiver 100 is illustrated in FIG. 2A. FIG. 2A is a block diagram illustrating one example frequency hopping transceiver 200, in accordance with one or more aspects of the present disclosure. As FIG. 2A shows, direct self-interference is avoided by utilizing orthogonal channels for the transmitter (e.g., transmit channels 238) and receiver (e.g., receive channels 234). That is, in this example, the transmitter and receiver never occupy the same channel at any given time. The transmitter may include transmitter correlator 214 and fast-hopping transmitter local oscillator (TX LO) 212. The receiver may include receiver correlator 208 and fast-hopping receiver local oscillator (RX LO) 210. Each local oscillator (e.g., TX LO 212, RX LO 210) may comprise a digital oscillator. In some examples, to accommodate a 470 Kbit/s data rate and 20 dB of blocker suppression, a hopping speed of 47 Mhop/s may be used for the frontend. A 4-path filter is used that is tuned to one of the channels at any point in time. Being passive, the filter is highly linear with noise performance that may be limited by its load termination, e.g., low-noise amplifier (LNA) 226. Even with the 25 dB suppression from the duplexer, about 8 dBm of transmit power shows up at the receiver frontend (e.g., at the front end of receive correlator 208). An all passive self-interference cancellation (SIC) circuit 220 is used to suppress this transmit channel interference (orthogonal from the receiver channel) from overloading the receiver frontend.

A 60 MHz band-select filter 204 may be used directly after the antenna 202 to suppress any out of band interference. The fast hopping local oscillator signals for the transmitter/receiver (e.g., signals for TX LO 212, signals for RX LO 210) are generated using programmable ultra-fast hopping digital oscillators (DO). Two separate digital oscillators (e.g., TX LO 212, RX LO 210) may be used as the TX and RX channels are orthogonal. An external power amplifier (PA) 224 is used to generate the, e.g., +33 dBm output required. A portion of PA 224 output is coupled via a directional coupler 22 to on-chip SIC circuit 220.

A 0.3 GHz digital local oscillator (LO) 228 also may optionally be included in the design shown in FIG. 2A. This 0.3 GHz local oscillator 228 may be communicatively coupled to receiver correlation circuitry 719 and to the transmitter correlation circuitry 214, and may be configured to provide an offset to the one or more transmit signals arriving at the transmitter correlator 214, and/or to the de-spread one or more frequency-hopped data signals output by the receiver correlator 208.

Figure 2C:
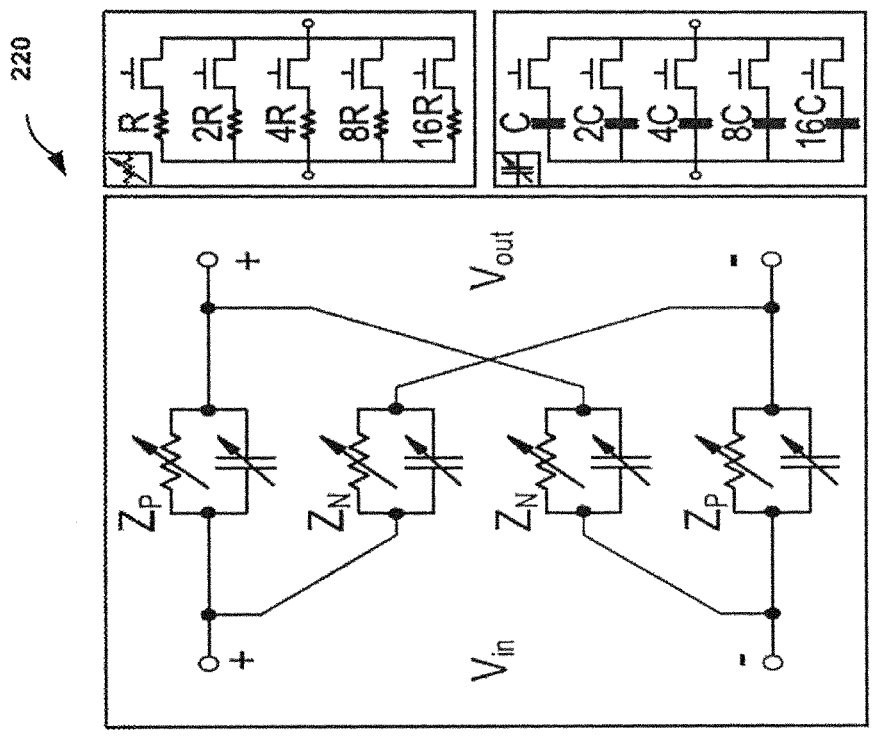
Figure 2B:
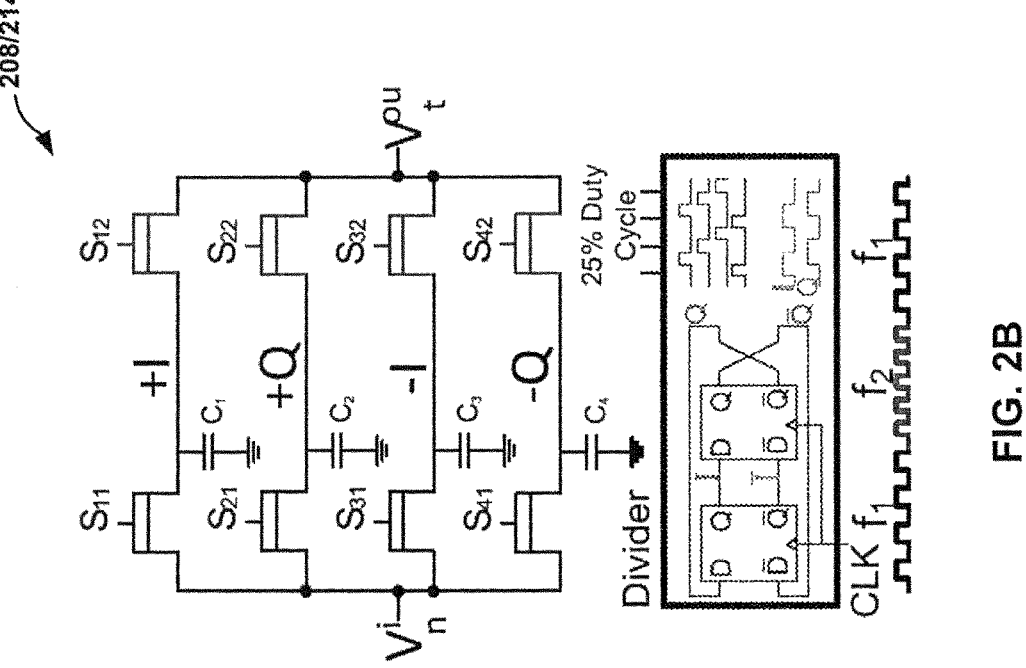

FIGS. 2B-2C illustrate example circuit details for the transmit and receive correlators and SIC circuitry. For example, FIG. 2B illustrates example circuit details for receiver correlator 208 and/or transmitter correlator 214, while FIG. 2C illustrates example circuit details for SIC 220. The transmit and/or receiver correlators 214/208 are implemented as a set of four-phase passive mixers with 25% duty cycle clocks, as shown in FIG. 2B. The correlator design is essentially identical to an N-path structure except that the input and output mixers are operated at different frequencies. In an N-Path filter, both mixers are operated at the same frequency, and usually, one is removed from the design for improved, noise performance. Here, the dual-mixer format is maintained for flexibly and for improved out-of-band performance.

For the transmitter correlator 214, the input mixers are connected to a fixed-frequency LO, and the other one is driven by an ultra-fast FH LO (e.g., TX LO 212). The input data are down-converted to baseband from a fixed RF center frequency and up-converted back to RF using the fast-hopping LO signal. The same circuit is used for the receiver correlator 208 but with opposite directions. When synchronized, receiver correlator 208 down-converts the received hopping signal on the baseband capacitors. The received signal is then up-converted to a fixed frequency and further processed by a receiver (e.g., a commercial, off-the-shelf receiver). The switches are implemented using 1 V RF nMOS devices, and they have 3Ω series resistance when they are ON. The baseband capacitors are implemented using only MIM capacitors so that the linearity is only limited by the nMOS switches. The 25% duty cycle clocks are generated using a divide-by-two flip-flop loop and standard logic operations.

The correlator is an RF bandpass filter that changes the center frequency according to the LO signal (e.g., signal from RX LO 210 for receiver correlator 208, signal from TX LO 212 for transmitter correlator 214). Hence, if two tones exist in-band, they will generate a third order intermodulation product (IM3) products that may fall in-channel. A low-frequency LTI model for N-path filters is used to develop an analytical model to evaluate the ratio between in-band third order intercept point (IIP3) and out-of-band IIP3 for the design. The large jammer causes $V_{GS}$ of the switch to vary. As the frequency moves away from the channel center, the capacitor becomes more of a short reducing the signal amplitude of the jammers. In various examples, the channel hops but the jammers are assumed to be stationary. However, for a simpler analysis, the channel may be stationary and the jammers hop. In some cases, there are a total of 100 channels but only certain combinations of two tones fall in-band.

Due to high PA power, SIC circuit 220 may be very linear suggesting a passive structure. The circuit may also have minimal impact on the noise figure (NF) of the receiver. As shown in FIG. 2C, SIC circuit 220 is implemented using resistors, capacitors, and switches, where the design may use an R-2R and C-2C ladder networks, with binary resister and capacitor ratios. Both designs start with the NF consideration first. In some cases, a 200Ω resistor only degrades the NF by 0.5 dB when the receiver NF is 1 dB. This means that the smallest combination of the resistors in the circuit are larger than 200 Ωs. The capacitors are then sized accordingly. The switches are located on the receive side where cancellation occurs, as they do not see large voltage swings. The circuit does not consume any DC power. Dynamic power is small due to slow reconfiguration speed which, at maximum, only operates at the hop rate.

Figure 3:
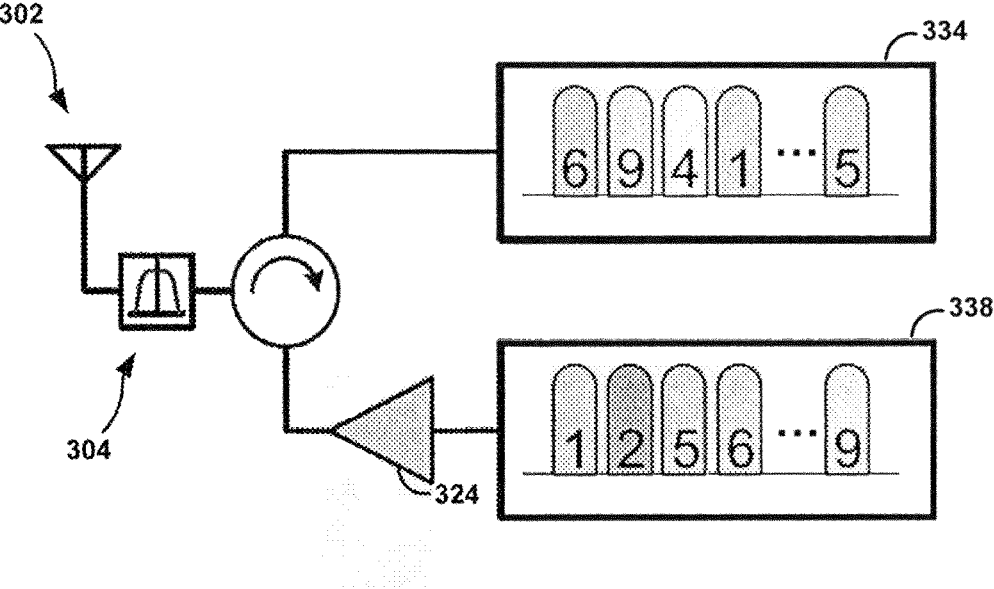
FIG. 3 is a conceptual diagram illustrating an example of self-interference suppression via orthogonal frequencies for a transmitter and receiver, in accordance with one or more aspects of the present disclosure.

FIG. 3 is a conceptual diagram illustrating an example of self-interference suppression via orthogonal frequencies for a transmitter and receiver, in accordance with one or more aspects of the present disclosure. Antenna 302 shown in FIG. 3 may be one example of antenna 202 shown in FIG. 2A, band-select filter 304 may be one example of band-select filter 204 of FIG. 2A. Power amplifier 324 in FIG. 3 may be one example of power amplifier 224 in FIG. 2A. Transmit channels 338 in FIG. 3 may be one example of transmit channels 238 in FIG. 2A, and receive channels 334 may be one example of receive channels 234 in FIG. 2A. As FIG. 3 shows, the design of orthogonal hopping sequences guarantees that the transmitter and the receiver always operate at different channels at any given time, and, as a result, there is little to no in-band self-interference other than that due to the finite filtering slopes. Out-of-band interference can be canceled using other out-of-band cancellation techniques.

Figure 4A:
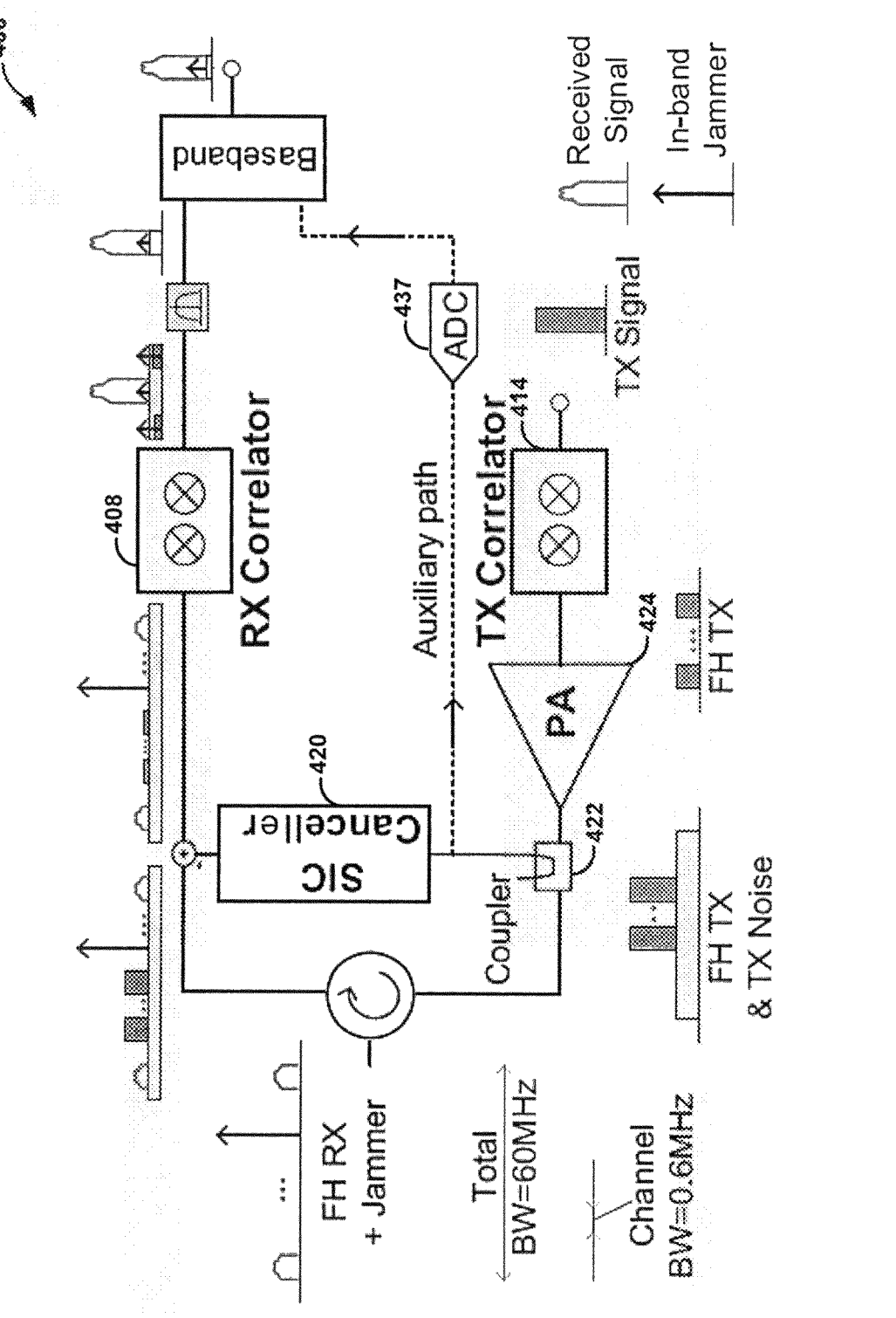
FIGS. 4A-4B are diagrams illustrating example signal flows through the overall architecture, in accordance with one or more aspects of the present disclosure.
Figure 4B:
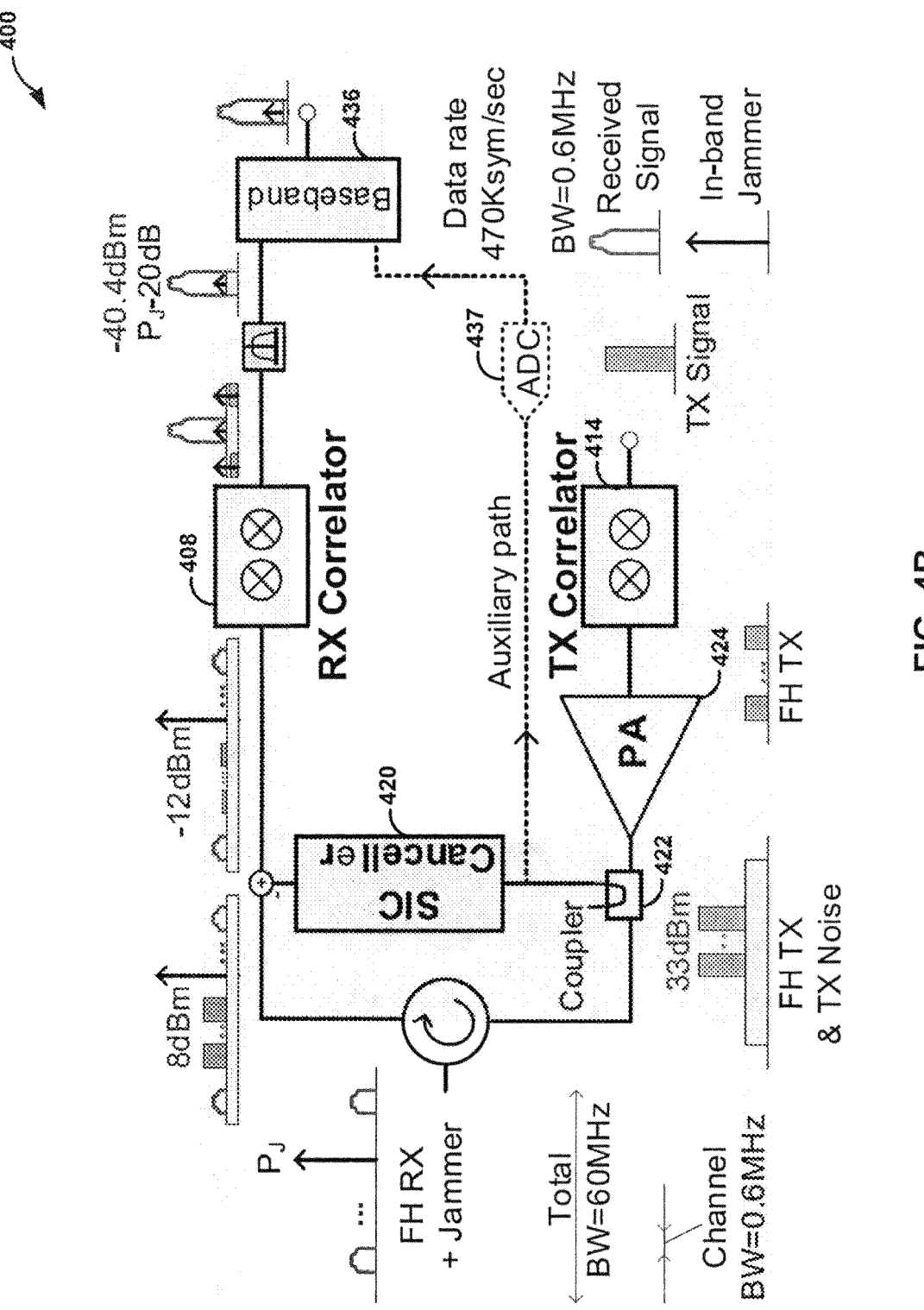

FIGS. 4A-4B are diagrams illustrating example signal flows through the overall architecture, in accordance with one or more aspects of the present disclosure. In FIGS. 4A-4B, transmitter correlator 414 may be one example of transmitter correlator 214 in FIG. 2, power amplifier 424 may be one example of power amplifier 224, coupler 422 may be one example of coupler 222, SIC canceller 420 may be one example of SIC canceller 220, and receiver correlator 408 may be one example of receiver correlator 208.

The overall system operation may be better understood with the help of FIGS. 4A-4B, which shows the signal flow throughout the system 400, starting at transmitter correlator 414. The modulated TX signal is frequency hopped (FH) by the fast hopping TX correlator 414. This signal is amplified by the 2-watt off-chip power amplifier (PA) 424. Power amplifier 424 adds broadband noise due to the finite noise figure of power amplifier 424. A portion of this signal (−25 dB down) couples through the coupler 422 (e.g., duplexer) to receiver correlator 408. Receiver correlator 408 receives the frequency hopped transmitter signal plus a narrow-band CW in-band jammer signal, as shown. SIC canceller 420 block cancels the fast hopping transmitter leakage at receiver correlator 408. This signal then passes through receiver correlator 408, where receiver correlator provides, e.g., 20 dB of processing gain while the jammer is spread by, e.g., 20 dB. A filtered version of this signal is sent to the baseband where any residual out of channel signal is removed. The broadband transmitter noise signal can be suppressed in the digital baseband using an axillary path, via analog-to-digital converter (ADC) 437, as shown in FIGS. 4A-4B.

This in-band jammer rejection property in frequency hopped systems exists if there is processing gain. The correlators in the disclosed design (e.g., transmitter correlator 414, receiver correlator 408) may, in various examples, be passive N-path switched-capacitor circuits that possess good linearity. This signal processing is done in the current domain, which limits the voltage swing at the correlator input due to the blocker, enhancing the jammer handling capability of the receiver. In various examples, the system can operate effectively with jammers that are, e.g., 20 dB larger than what would have saturated a normal receiver. A brief explanation of the jammer rejection is as follows.

Assuming that the receiver visits all the N channels before returning to the channel with the interferer, it only sees the jammer 1/Nth of the time. However, the signal is seen at each of the N channels. Therefore, effectively, the jammer power after the correlation process is reduced by N times while the signal power is retained. In the present design, with one example in which N=100, i.e., 100 channels, the jammer suppression is 10 log (N)=20 dB.

In various examples, the techniques described herein may also provide multi-path resilience. In a wireless channel, a signal travels through different paths to get from transmitter correlator 414 to receiver correlator 408. The signal that reaches receiver correlator 408 therefore, contains multiple copies of the original signal with different delays and amplitudes. The amplitudes and delays differ since the length of each path can potentially be different. In the worst case, these copies could result in complete cancellation (frequency selective fading) and inter symbol interference (ISI). Traditionally, equalization is performed at the receiver baseband to align the received copies and recover the signal. However, in the various examples of the present design, it can be shown that in many typical multipath environments, there is no ISI due to fast hopping nature of receiver correlator 408. Receiver correlator 408 may be configured to jump to a new frequency before the signal from the second path at first frequency arrives at receiver correlator 408. Since the delay from the transmitter to the receiver at each channel is different, these are aligned if the signal is to add up correctly. However, there is no ISI. This means that each channel can now be "equalized" by a single complex coefficient in the frequency domain that corrects for the different delays at different frequencies. In many cases, ISI can be avoided when the hop-rate (T-hop) is fast enough so that receiver correlator 408 only captures the signal that arrives from the first path and not the other copies. All the other copies disappear after Tdelay (delay spread). A fast hopping band-pass filter is realized using a combination of the well-known N-path structure and fast hopping (localized oscillator) LO generators, where, in certain non-limiting examples, N=4.

FIG. 4B is another diagram illustrating receive, self-interference, and jammer signal flows through the signal in further detail. Similar to the example of FIG. 4A, the modulated transmit signal is fast hopped by the fast-hopping transmitter correlator 414. This signal is amplified by the 2-W off-chip power amplifier 424 (33 dBm). PA 424 adds broadband noise. A portion of this signal (−25 dB down) couples through the duplexer 422 to the receiver (now at +8 dBm). Receiver correlator 408 sees the fast hopped receive signal plus a narrow-band CW in-band jammer. SIC canceller 420 partially cancels (by 20 dB) the fast-hopped transmitter leakage at the receiver (now at −12 dBm). This signal then passes through receiver correlator 408, where receiver sees 20 dB of processing gain while the jammer is spread by 20 dB. A filtered version of this signal is sent to baseband 436 where any residual out of channel signal is removed.

As mentioned earlier, the transmitter and receiver channels are orthogonal, and the amount of the transmitter channel power that shows up in-band in the receiver channel is a function of the transmit and receive channel separation and the filtering capabilities of the N-path-based correlators. The residual transmit signal after SIC canceller 420 is orthogonal to the receiver LO and, hence, gets reduced by the correlator. Due to the ultra-fast hopping speed of the transceiver, the rejection is limited, and a portion of this power shows up in the receiver channel. The sinc filter response caused by the fast hopping has its first null at the hop rate of 47 MHz, according to certain examples. Therefore, there is still significant transmit energy in the receiver channel. The transmitted signal over one symbol can be written as shown in equation (1) below, where P[t] is the rectangular pulse, $T_h$ is the hop time, N is the total number of channels, $f_{T_i}$ is the transmit frequency at the ith hop, and $\Phi_T$ (i) is the necessary phase at the ith hop at transmitter correlator 414 to ensure continuity between the frequency hops:

$$x(t) = \sum_{i=1}^{N} P[t - (i-1)T_h]\sin[2\pi f_{T_i}t + \Phi_T(i)] \tag{1}$$

The signal at receiver correlator 408 then is given by equation (2), where $f_{R_i}$ is the receive frequency and $\Phi_R(i)$ is the necessary phase at the ith hop at the receiver to ensure continuity between the frequency hops:

$$y(t) = \sum_{i=1}^{N} P[t - (i-1)T_h]\sin[2\pi f_{T_i}t + \Phi_T(i)]e^{j2\pi f_{R_i}t + \Phi_R(i)} \tag{2}$$

The spectrum at the receiver can be estimated by performing the Fourier transform of (2), which can be written as shown in equation (3) shown below. Here, it is noted that the transmitter and receiver channels are distinct and that the final spectrum has a sinc shape that is proportional to the hop-time Th. This means that even if receiver and transmitter channels are different, there is still going to be spill over from transmitter to receiver. The spacing between transmitter and receiver frequencies alters the phase and the sinc magnitudes of each of the summation terms that fall in-band and changes the self-interference that shows up in the receiver band. As the hopping speed increases, Th decreases, which widens the sinc function that causes more energy to show up in the receive baseband. This problem is normally not seen at lower hopping speeds, as the sinc main lobe is much narrower. This phenomenon is verified via numerical simulations and also via measurements as discussed later.

$$Y(f) = \frac{T_h}{2j}\sum_{i=1}^{N} e^{-j(2i-1)\pi T_h(f-fR_i)} \times \tag{3}$$
$$\left[ \mathrm{Sinc}\Big(T_h\big(f - f_{R_i} - fT_i\big)\Big) \times e^{j((2i-1)\pi T_h(fT_i - fR_i) + \Phi_T(i) + \Phi_R(i)} - \right.$$
$$\left. \mathrm{Sinc}\Big(T_h\big(f - f_{R_i} + f_{T_i}\big)\Big) \times e^{-j((2i-1)\pi T_h(fT_i - fR_i) + \Phi_T(i) + \Phi_R(i)} \right].$$

The measurement results for the transmit signal seen at the receiver channel for a ten-channel separation between the transmitter and receiver show a 27 dB suppression of the transmit signal. For the 8 dBm transmit signal input at the antenna and 20 dB suppression by the SIC canceller 420, this results in a −40.4 dBm self-interference in the receive channel, as shown in FIG. 2B. The broadband transmit noise signal can be suppressed in the digital baseband using an auxiliary path, such as the auxiliary path shown in FIGS. 4A-4B. In the case of PA 424, the primary limitation is that since transmitter correlator 414 is before PA 424, PA 424 may pass the fast hopping signal, i.e., it is sufficiently broadband. Not surprisingly, broadband PAs are normally less power efficient than high-Q narrow-band PAs.

Figure 5A:
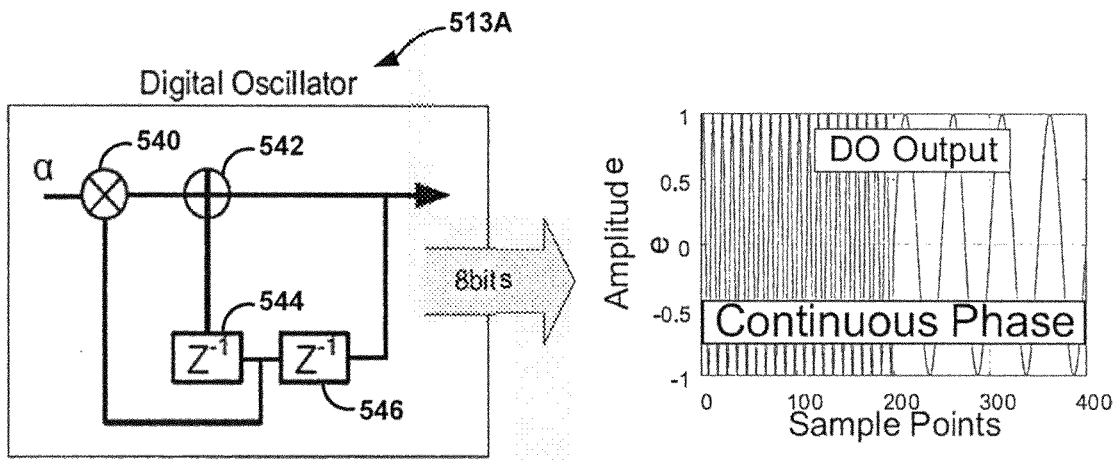
FIGS. 5A-5C are diagrams illustrating examples of a digital oscillator and a current-steering digital-to-analog converter (DAC), along with example phase and/or current steering information, in accordance with one or more aspects of the present disclosure.

FIG. 5A is a diagram illustrating an example of a digital oscillator 513A, in accordance with one or more aspects of the present disclosure. A popular approach to synthesize custom signals is via DDS (direct digital synthesis). The problem with this approach however, is circuit complexity and high-power consumption. To mitigate these issues, an all-digital, ultra-fast hopping signal generator, such as a sine-wave digital oscillator (DO) 513A, is described herein, and shown in FIG. 5A. Prior architectures of digital oscillators were not intended for high speed operation. The digital oscillator described herein, and as shown, e.g., digital oscillator 513A in FIG. 5A, utilizes lower power and has higher speed operation. The design shown in FIG. 5A utilizes one additional register in comparison to prior architectures, but the number of integrators and multipliers is halved in comparison to prior architectures. As shown in FIG. 5A, oscillator 513A includes one multiplier 540, one adder (e.g., summation) circuit 542, and two registers 544, 546. The output frequency of DO 513A is centered around $f_s/4$ where $f_s$ is the sampling clock frequency. The value of a (e.g., hopping code) sets the output frequency. Setting $\alpha=0$ results in an output frequency of $f_s/4$. The value of a may also be referred to as "r2", such as shown in FIG. 5B, and r2 may be in the range of $-1 \le r2 \le 1$. The digital output of DO 513A is converted to an analog value using an on-chip current steering DAC (see, e.g., current steering DAC 515A in FIG. 5C). In this design, an 8-bit DAC is sufficient to maintain the required phase noise for the minimum sensitivity of the receiver when a high-Q fast hopping injection locked bandpass filter is used for filtering. The DAC resolution does however, affect close-in spurs and is discussed later. The high-Q filter may be utilized for improved out-of-band performance. FIG. 5A illustrates continuous phase between frequency jumps. Digital oscillator 513A may provide an 8-bit output, as shown.

In the example of FIG. 5A, the digital oscillation circuitry includes exactly one digital multiplier 540, exactly one digital adder 542, and exactly two registers 544/546, where the hopping code is provided as input to the exactly one digital multiplier 540 of the transmission digital oscillation circuitry. In certain examples, the illustrated digital oscillation circuitry may be associated with a transfer function $z^{-2}+r_2z^{-1}+1=0$, wherein $r_2$ represents the hopping code, and wherein $z^{-1}$ and $z^{-2}$ represent respective z transforms.

Figure 5B:
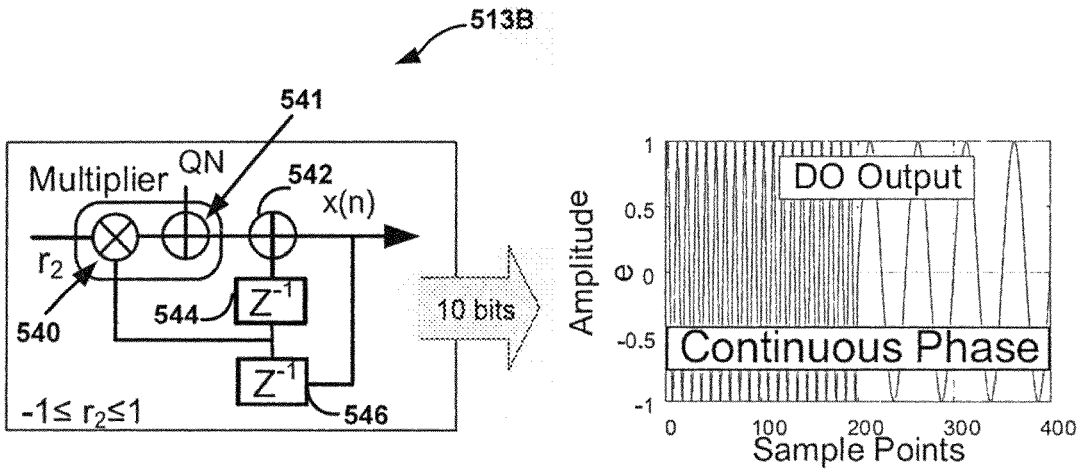

FIG. 5B illustrates another example of a digital oscillator 513B, where multiplier 540 further includes a quantization noise (QN) source 541. Digital oscillator 513B may provide an 10-bit output, as shown. The DO model with quantization noise is shown in FIG. 5B, where the input coefficient to DO 513B, r2 (e.g., the hopping code), sets the oscillation frequency. Therefore, the quantization noise due to finite computation accuracy may cause perturbations in the oscillation frequency, i.e., phase noise. In certain cases, the only contributor to quantization noise is digital multiplier 513B. In general, if two operations of w bits are multiplied, then the resultant can have a maximum of 2w bits. However, in various examples, the output is also limited to w bits, as r2 is limited by ±1, which bounds the quantization noise.

The quantization noise distribution for a multiplier (e.g., multiplier 540) where one of the inputs is a constant is the same as the quantization noise from a regular quantizer (i.e., ADC). Thus, the analysis can be simplified in certain examples by assuming that the quantization noise can be modeled as an additive white noise. Using phase noise analysis methods similar to continuous-time LC oscillators, an analytical model is used for the phase noise contribution of the computational accuracy of digital oscillators. This analytical model is used to derive the phase noise at 100 KHz and 1 MHz offsets for 8-16 bits of accuracy. The DO (e.g., oscillator 513B) generates a binary sample-and-hold sinusoidal signal with W bit resolution. The DO output is then converted to the analog domain by a DAC (e.g., DAC 515A shown in FIG. 5C). Because one goal is to hop rapidly between frequencies, a memoryless DAC, i.e., not a sigma-delta, may be used. The output from the M bit DAC is then filtered by an ILO (injection-locked oscillator) with very high Q to remove the unwanted harmonics. ILOs can act as high-Q bandpass filters that can jump frequencies almost instantly. The fast-hopping nature of the DO, the DAC, and the ILO enables the LO frequency to change almost instantaneously. The settling time is primarily limited by the digital circuits that provide the control signals. FIG. 5B illustrates continuous phase between frequency jumps.

Figure 5C:
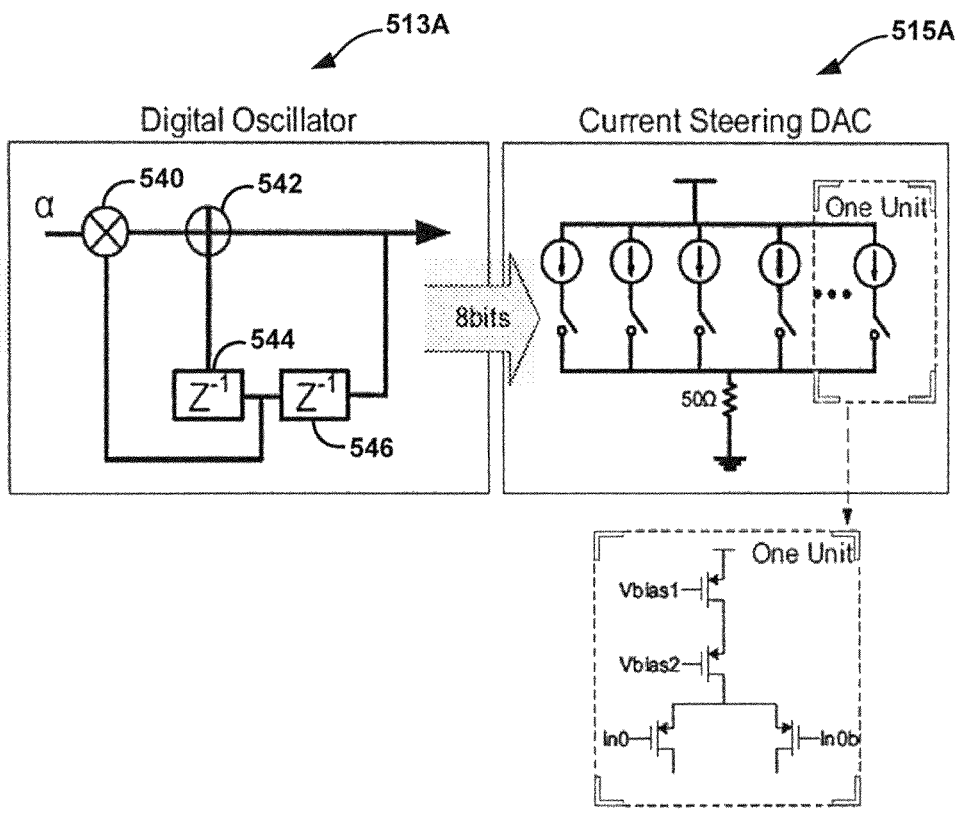

FIG. 5C is a diagram illustrating an example of digital oscillator 513A of FIG. 5A coupled to a current-steering digital-to-analog converter (DAC) 515A, along with example current steering information, in accordance with one or more aspects of the present disclosure. In certain other examples, digital oscillator 513B of FIG. 5B may be coupled to DAC 515A.

The top left-hand side of FIG. 5C illustrates the example structure of digital oscillator 513A, which includes multiplier 540, adders 542, and registers 544, 546. The top right-hand side of FIG. 5C illustrates the example current-mode, or current-based, 8-bit DAC 515A. The bottom right-hand side of FIG. 5C illustrates example details of current-steering DAC 515A.

The 25% duty cycle clocks required to drive the 4-Path filter are realized using flip-flops and logic. The left-hand mixer down-converts the RF signal to direct current (DC) and the right-hand mixer up-converts the DC baseband signal to a desired fixed RF signal (see, e.g., FIG. 2A). The second mixer is included to take advantage of the ultra-low noise amplifiers available on the market to minimize the overall receiver noise figure (NF). In some examples, the second mixer can be replaced by baseband circuits to realize a frequency hopped mixer-first receiver. The N-path filter is able to hop from one frequency to another almost instantaneously because of the all digital 25% clock dividers and because the signal history is only maintained at DC on the baseband capacitors. In some examples, the switches are designed to have 3 ohms of series resistance. To enhance linearity, metal-insulator-metal (MIM) capacitors may be used in this design such that the linearity is only limited by the switches.

The digital output of DO 513A is converted to an analog value using the on-chip current steering DAC 515A. In this design, an 8-bit DAC is sufficient to maintain the phase noise for the minimum sensitivity of the receiver when a high-Q fast hopping injection locked bandpass filter is used for filtering. The DAC resolution does however, affect close-in spurs. The high-Q filter may be utilized for improved out-of-band performance. In other examples in which oscillator 513B is used with DAC 515A, DAC 515A may comprise a 10-bit DAC, based on the 10-bit output provided by oscillator 513B.

Figure 6:
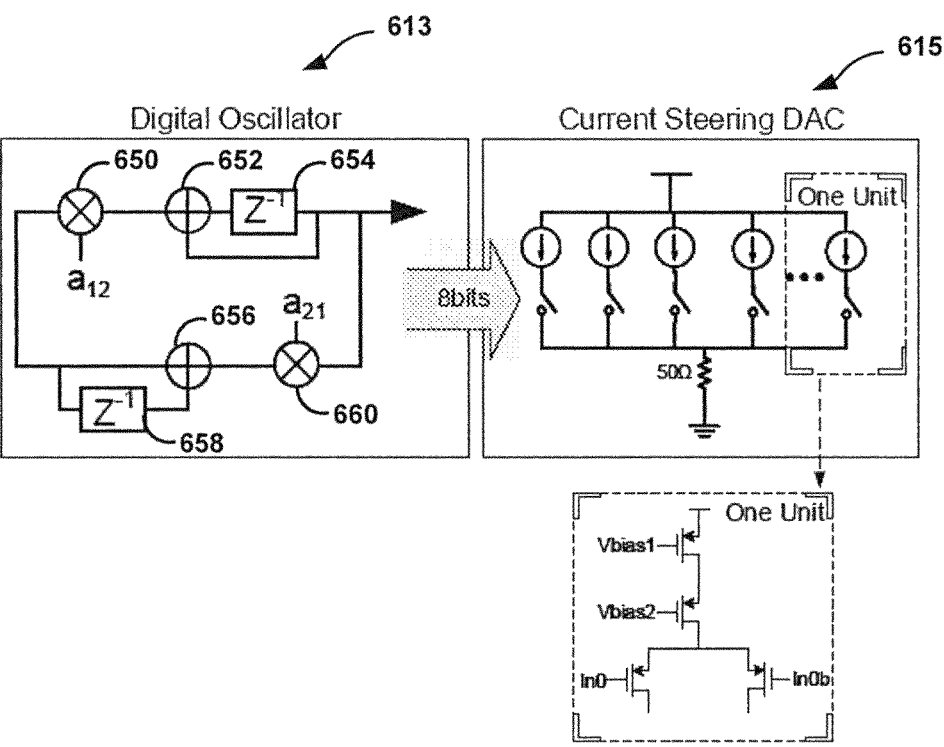
FIG. 6 is a diagram illustrating another example of a digital oscillator and a current-steering DAC, along with example current steering information, in accordance with one or more aspects of the present disclosure.

FIG. 6 is a block diagram illustrating another example of a digital oscillator 613 and a current-steering DAC 615, along with example current steering information, in accordance with one or more aspects of the present disclosure. In this example, digital oscillator 613 includes two multipliers 650/660 and two adders 652/656, as well as two registers 654/658. Digital oscillator (DO) 613 illustrated in FIG. 6 emulates an 'LC' tank by utilizing inverting and non-inverting integrators. The instantaneous output frequency of digital oscillator 613 is decided by the hopping code, which in particular if set to $\sqrt{2}$ results in an output frequency that is exactly $f_{clk}/4$. In a manner analogous to an analog LC tank, the instantaneous frequency is decided by $\frac{1}{2}\pi\sqrt{LC}$. The sample-and-hold output of digital oscillator 613 is converted to a sample-and-hold analog value using current steering DAC 615. An aliased value of this output at $f_{clk}+f_{sig}$ is appropriately filtered out using the high-Q bandpass characteristics of an injection locked oscillator. Normally, a high-Q filter takes Q cycles to settle to its final value. However, an injection locked oscillator can jump to a new frequency instantaneously by changing the center frequency to a new value. The resulting signal is then divided to drive a 4-phase switched-capacitor correlator. On the transmit side, the baseband signal is generated using a traditional transmitter architecture at a fixed RF frequency. The signal is then up-converted using an ultra-fast-hopping local oscillator. The resulting signal is then amplified using an external power amplifier (PA) and fed to the antenna.

Figure 7:
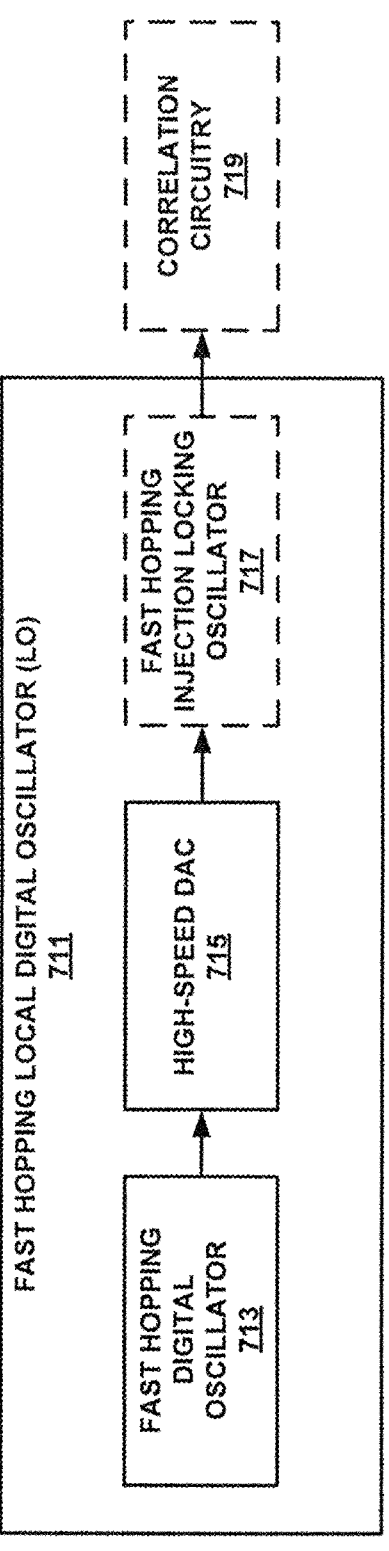
FIG. 7 is a block diagram illustrating an example digital oscillator that includes or is otherwise communicatively coupled to an example injection locking oscillator, in accordance with one or more aspects of the present disclosure.

FIG. 7 is a block diagram illustrating an example digital oscillator that includes or is otherwise communicatively coupled to an example injection locking oscillator, in accordance with one or more aspects of the present disclosure. In the example of FIG. 7, fast hopping local digital oscillator 711 includes a fast hopping digital oscillator 713, a high-speed DAC 715, and an optional fast-hopping injection locking oscillator 717. In some cases, local digital oscillator 711 may be communicatively coupled to correlation circuitry 719, such as the transmitter correlator or receiver correlator shown in FIGS. 2A-2C, or such as TX correlation circuitry 114 or RX correlation circuitry 108 shown in FIG. 1. The digital oscillator and current-steering DAC shown in FIGS. 5-6 are non-limiting examples of digital oscillator 713 and high-speed DAC 715 shown in FIG. 7.

For example, in non-limiting examples such as shown in FIG. 5A-5C, digital oscillator 713 may comprise digital oscillation circuitry that includes exactly one digital multiplier, exactly one digital adder, and exactly two registers, where the digital oscillation circuitry is configured to provide digital oscillation signals at one or more frequencies as a function of a programmable hopping code, and where the programmable hopping code is provided as input to the exactly one digital multiplier. High-speed DAC 715 may be configured to convert the digital oscillation signals from the digital oscillation circuitry into analog oscillation signals.

In some examples, the digital oscillation circuitry is associated with a transfer function $z^{-2}+r_2z^{-1}+1=0$, wherein $r_2$ represents the programmable hopping code, and wherein $z_{-1}$ and $z^{-2}$ represent respective z transforms. High-speed DAC 715 may comprise, in some cases, an 8-bit DAC, and the digital oscillation signals may comprise 8-bit signals. In different examples, high-speed DAC 715 may be one of a current-based DAC, a resistor-based DAC, or a capacitor-based DAC.

In some examples, the digital oscillation circuitry provides the digital oscillation signals at the one or more frequencies that are centered around fs/4 based on the hopping code, where fs is a sampling clock frequency for the digital oscillation circuitry. In various examples, the output frequency of the digital oscillator can range anywhere between 0 to fs/2, based on the programmable hopping code. Optional injection locking oscillator 717, which is communicatively coupled to high-speed DAC 715, may function as a bandpass filter with respect to the analog oscillation signals. Injection locking oscillator 717 may comprise a high-Q fast hopping injection locked bandpass filter that is used for filtering to improve out-of-band performance.

Injection locked oscillator 717 may be configured to jump to a new frequency instantaneously by changing the center frequency to a new value.

Figure 8A:
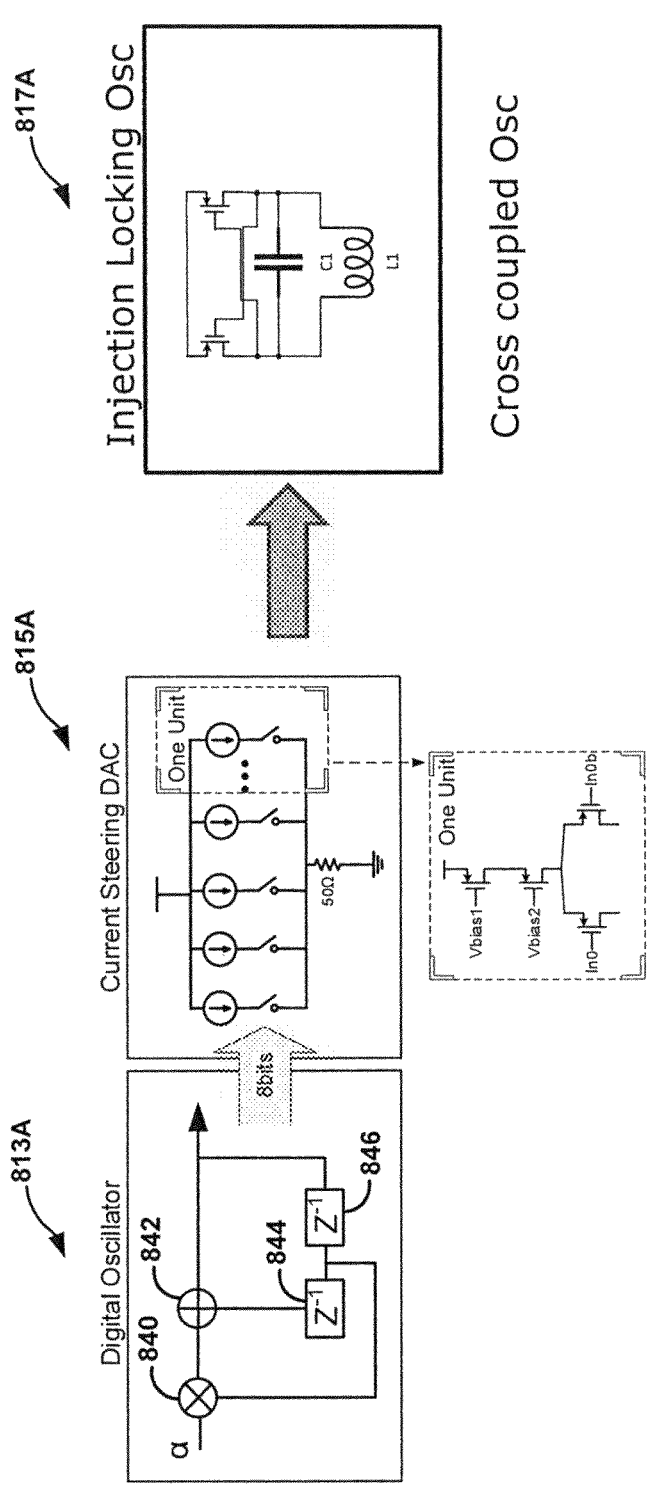
FIGS. 8A-8B are diagrams illustrating example digital oscillators that include or are otherwise communicatively coupled to example injection locking oscillators, in accordance with one or more aspects of the present disclosure.

FIG. 8A is a diagram illustrating an example digital oscillator 813A that includes or is otherwise communicatively coupled to an example injection locking oscillator 817A, in accordance with one or more aspects of the present disclosure. FIG. 8A is similar to FIG. 5A but additionally shows the coupling of the example current-steering DAC 815A (one example of DAC 715 shown in FIG. 7) to injection locking oscillator 817A (one example of injection locking oscillator 717). Similar to oscillator 513A, oscillator 813A shown in FIG. 8A includes digital multiplier 840, digital adder 842, and registers 844/846.

Figure 8B:
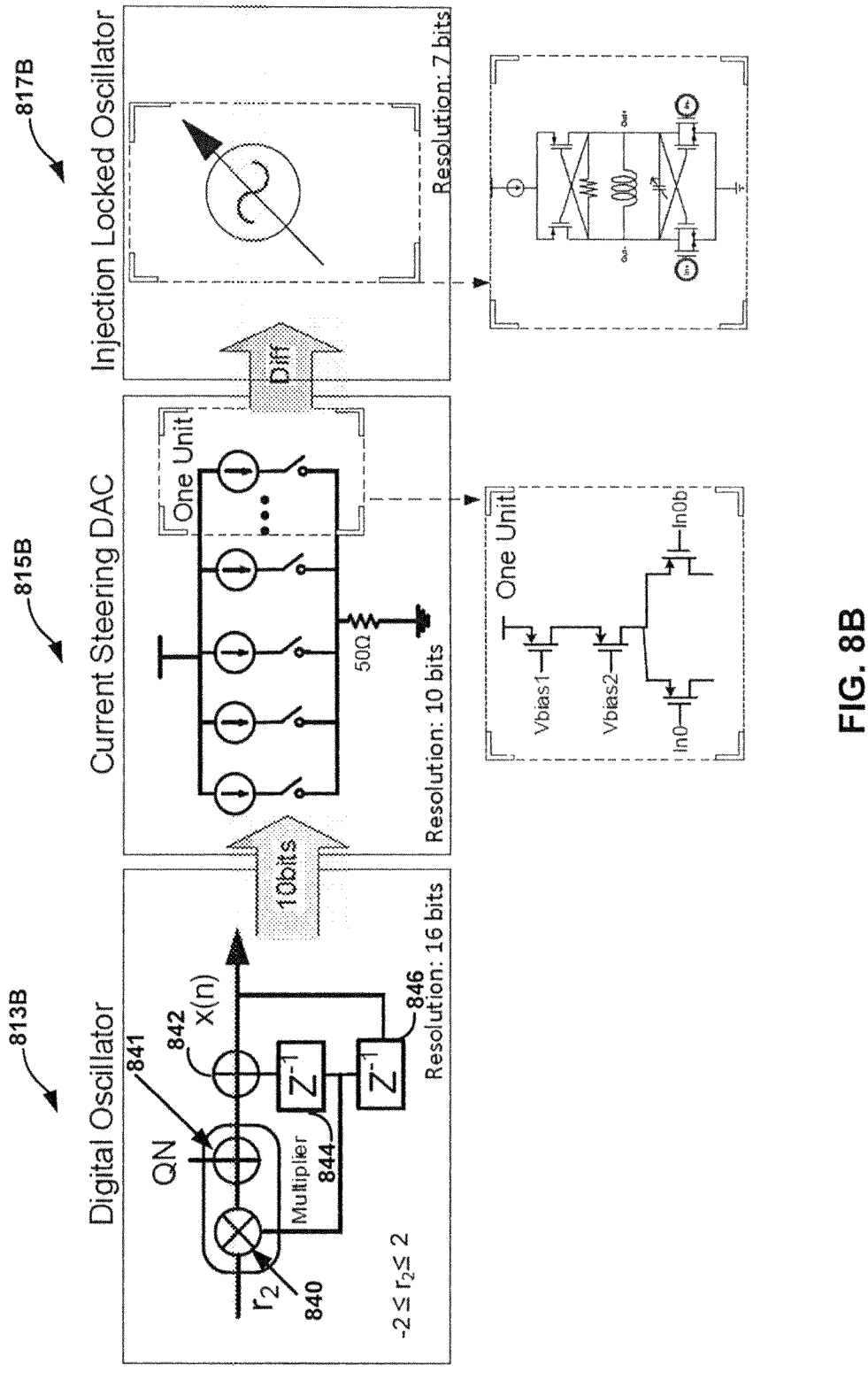

FIG. 8B is a diagram illustrating another example digital oscillator 813B that includes or is otherwise communicatively coupled to an example injection locking oscillator 817B, in accordance with one or more aspects of the present disclosure. FIG. 8B is similar to FIG. 5B but additionally shows the coupling of the example current-steering DAC 815B (one example of DAC 715 shown in FIG. 7) to injection locking oscillator 817B (one example of injection locking oscillator 717). Similar to oscillator 513B, oscillator 813B shown in FIG. 8A includes digital multiplier 840 that includes quantization noise source 841, digital adder 842, and registers 844/846.

The transfer function for digital oscillator 813B is given in equation (4) below, according to certain examples. The input r2, limited to −2 to 2, is the frequency control variable in the transfer function, and the roots of the resulting characteristic equation gives the oscillating frequency. Therefore, the poles can be written as shown in equation (5). As a result, the precise output frequency can be simplified to equation (6).

$$x(n-2) + r_2 x(n-1) + x(n) = 0 \tag{4}$$

$$z_{1,2} = \frac{-r_2}{2} \pm j\sqrt{1 - \frac{r_2^2}{4}} = e^{\pm j\cos^{-1}\left(-\frac{r_2}{2}\right)} \tag{5}$$

$$f_{out} = \frac{f_{clk}\cos^{-1}\left(-\frac{r_2}{2}\right)}{2\pi} \tag{6}$$

When $$r2 = 0, \; f_{out} = \frac{f_{clk}\cos^{-1}(0)}{2\pi} = \frac{f_{clk}}{4}.$$

The output frequency range can be varied from near 0 to $$\frac{f_{clk}}{2}.$$

At a given input $r_2$ [−2, 2], when $$r2 = 2, \; f_{out} = 0, \text{ and when } r_2 = -2, \; f_{out} = \frac{f_{clk}}{2}$$

the DO (e.g., oscillator 813B) can be seen as a bandpass filter, which amplifies the frequency of interest and suppresses the out of band signal. In a transceiver, the phase noise of the oscillator has significant impact on the error vector magnitude (EVM) and on jammer performance due to reciprocal mixing. The total phase noise will include the contributions from: 1) the input clock; 2) the digital oscillator; and 3) the LO DAC (e.g., DAC 815B) and injection locked oscillator (ILO) and duty cycle generators for the correlators.

Figure 9:
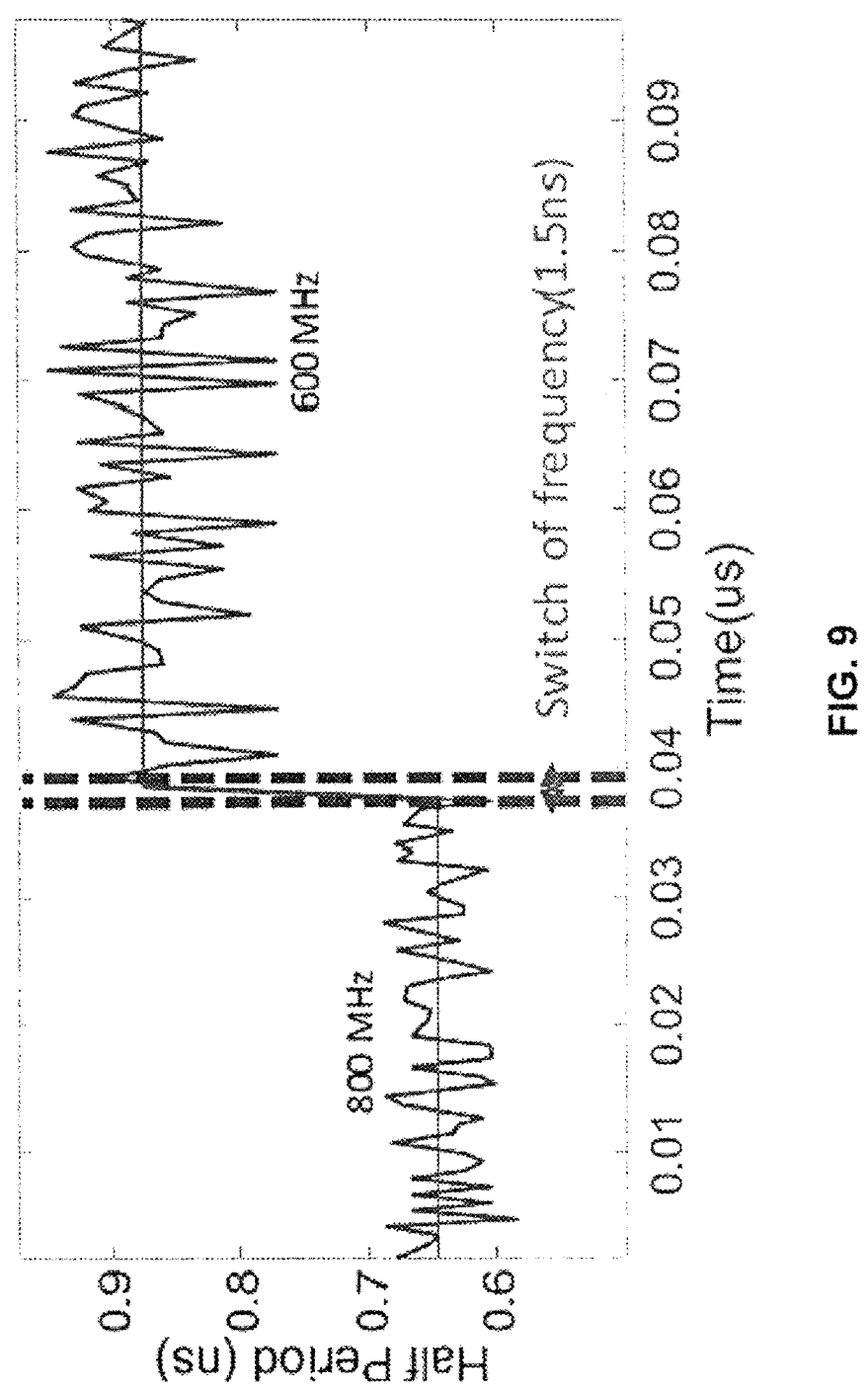
FIG. 9 is a graph diagram illustrating an example of measured speed for a digital oscillator and a DAC, such as those described in reference to FIGS. 5A-5C, in accordance with one or more aspects of the present disclosure.

FIG. 9 is a graph diagram illustrating an example of measured speed for a digital oscillator and a DAC, such as those illustrated in FIGS. 5A-5C, in accordance with one or more aspects of the present disclosure. In certain non-limiting examples, the front-end is fabricated in 65 nm RF complementary metal-oxide-semiconductor (CMOS) technology. FIG. 9 shows the measured transient time for the DO+DAC combination from 800 MHz to 600 MHz. The transient time is primarily due to digital circuits other than the DAC that has a 2 GHz signal bandwidth. To measure the frequency switch time, the DAC output was sampled with a 20 Gsps sampling scope that interpolates the sampled to 100 Gsps. The transient sampled output was lowpass filtered with a 100 tap finite impulse response (FIR) filter in Matlab (FIR to maintain linear phase). The frequency of operation was estimated by evaluating the zero crossings so the time resolution is limited by one-half period, or roughly 0.67 ns at 750 MHz. The measured transient time from 800 MHz to 600 MHz is 1.5 ns or about 1 clock period within our measurement resolution limits. The measured power consumption for a 1 GHz DO output ($F_{clock}/4$) for the DO+DAC is 6 mW. The measured frequency accuracy of the digital oscillator is better than 20 ppm in this design. Simulations suggest that the accuracy is even better and may be limited by the frequency resolution of the measurement technique.

Figure 10:
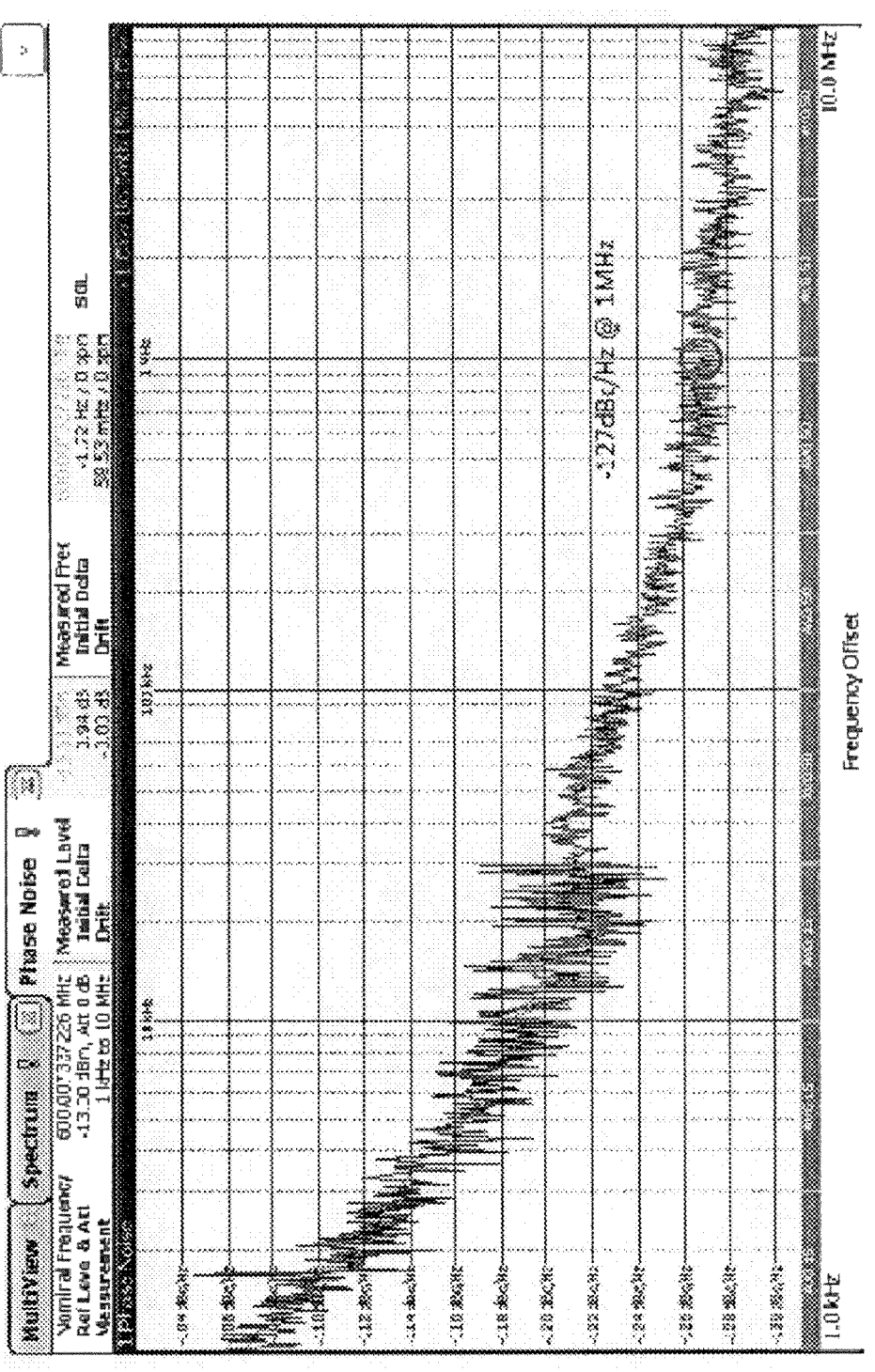
FIG. 10 is a graph diagram illustrating an example of measured phase noise of a digital oscillator and a DAC, such as those described in reference to FIGS. 5A-5C, in accordance with one or more aspects of the present disclosure.

FIG. 10 is a graph diagram illustrating an example of measured phase noise of a digital oscillator and a DAC, such as those illustrated in FIGS. 5A-5C, in accordance with one or more aspects of the present disclosure. FIG. 10 shows the measured phase noise of the fast hopping clock generation circuit at a fixed frequency of 600 MHz. The measured phase noise for the circuit is −127 dBc/Hz at 1 MHz offset and for the signal source is −140 dBc/Hz at 1 MHz offset. Experimental explorations suggest that the phase noise deterioration may be mainly due to the small DAC termination resistor (limiting signal amplitude) and due to the AM-PM conversion of the source follower buffer (for probing purposes) included after the DAC output. Within the DO, 16-bit resolutions are used throughout to minimize phase noise deterioration. The finite 8-bit resolution of the DAC does not add to the phase noise directly but adds to the tonal behavior of DO+DAC combination. A higher resolution DAC and dithering techniques can further reduce this tonal behavior. No spurs were seen within the 10 MHz bandwidth used for phase noise measurements.

Figure 11:
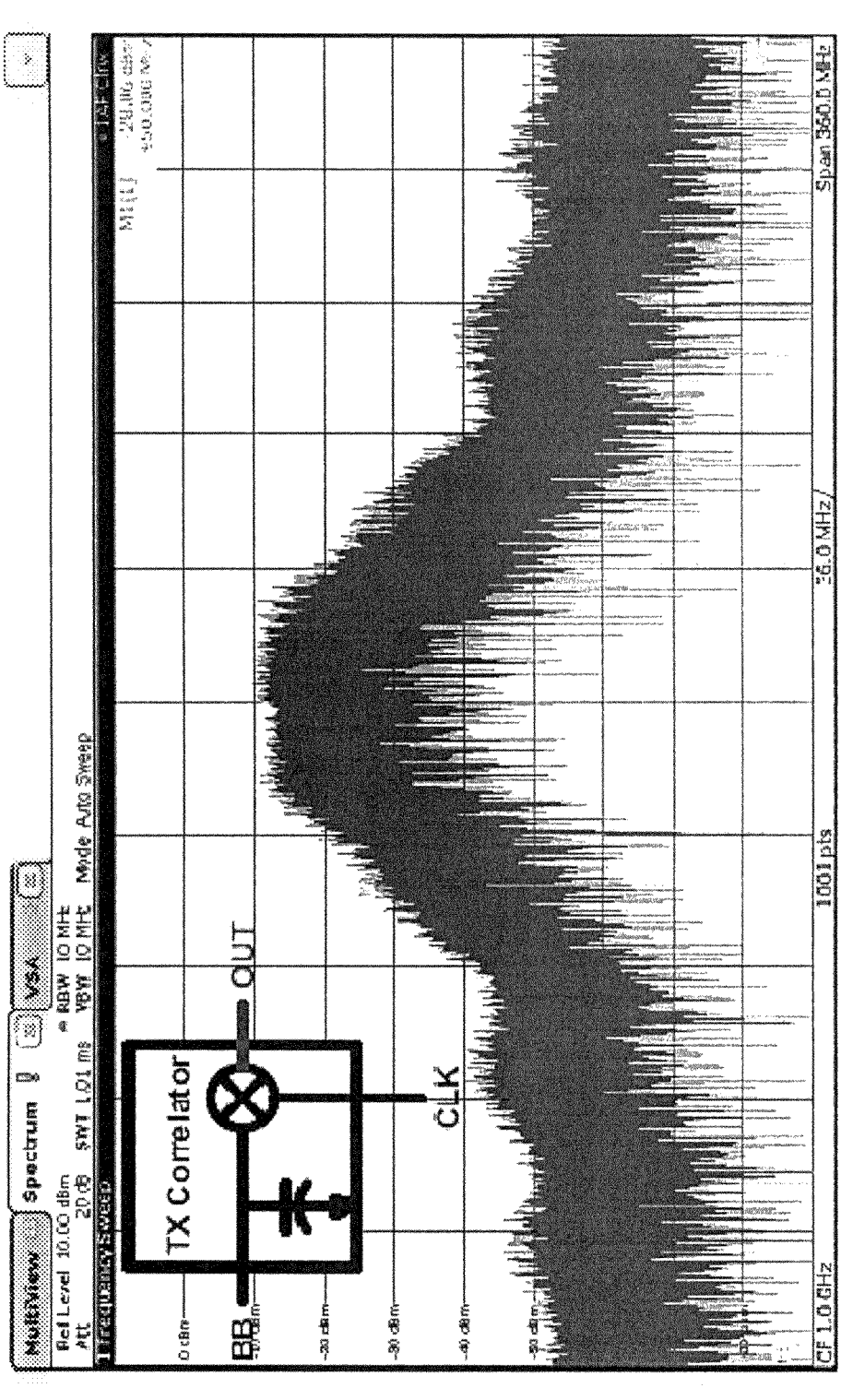
FIG. 11 is a graph diagram illustrating an example of a fast hopping transmit output spectrum, in accordance with one or more aspects of the present disclosure.

FIG. 11 is a graph diagram illustrating an example of a fast hopping transmit output spectrum, in accordance with one or more aspects of the present disclosure. The output spectrum of the transmit correlators driven by an arbitrary waveform generator (AWG) is shown in FIG. 11. The AWG was programmed to randomly hop across all 100 channels with a hop-rate of 50 MHops/s. The output shows the 20 dB spreading that is expected from the present design.

Even though the receiver and transmit paths use orthogonal channels, there may potentially be some self-interference leakage from the TX to the RX due to the finite out-of-band rejection (1st order) capability of the simple N-path filter. This is seen in FIGS. 12A-12B.

Figures 12A, 12B:
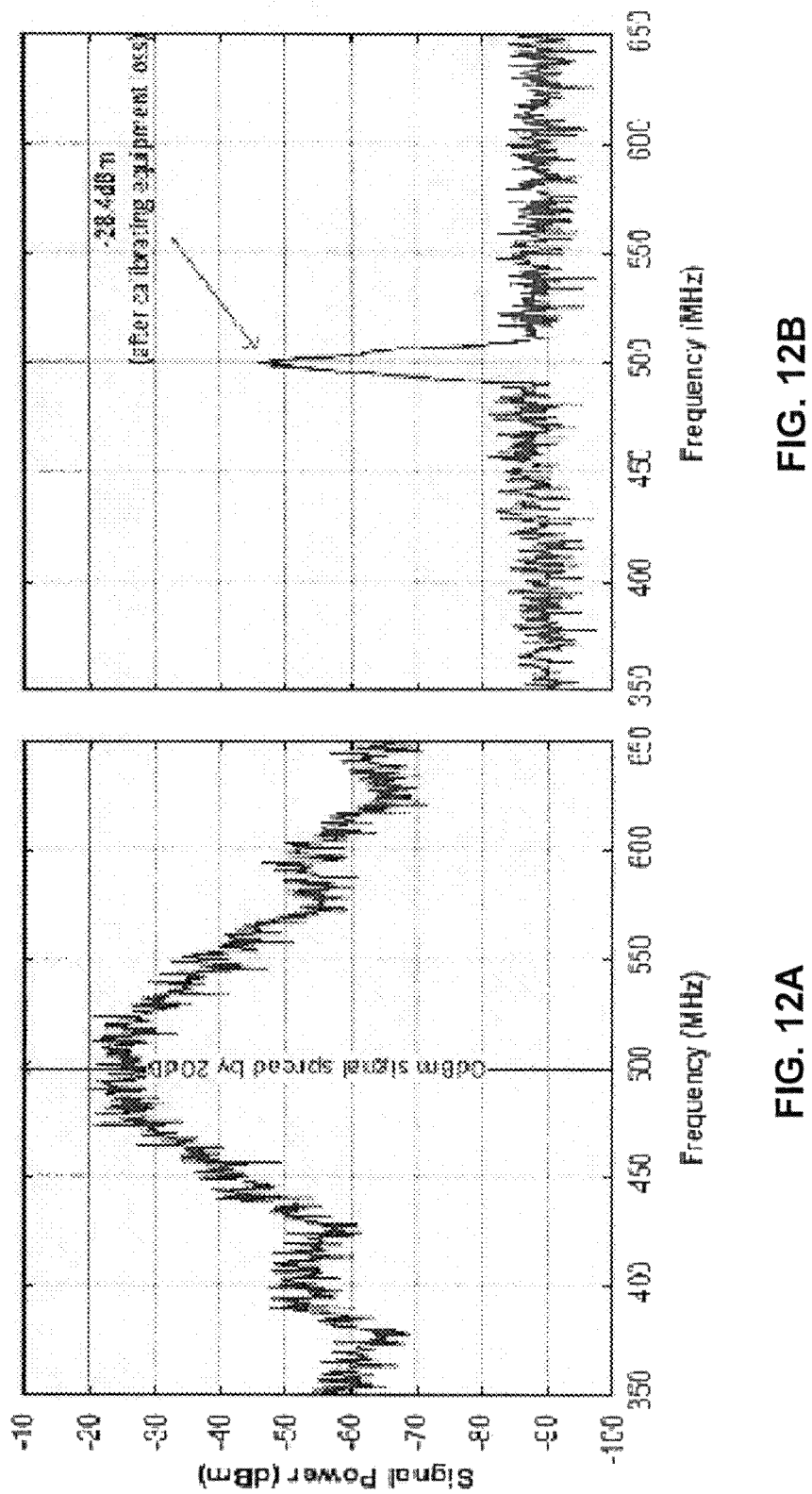
FIGS. 12A-12B are graph diagrams illustrating examples of self-interference cancellation due to orthogonal signaling, in accordance with one or more aspects of the present disclosure.

FIGS. 12A-12B are graph diagrams illustrating examples of self-interference cancellation due to orthogonal signaling, in accordance with one or more aspects of the present disclosure. FIG. 12A shows a 0 dBm TX signal that is spread by 20 dB, and FIG. 12B shows the measured RX signal after the correlator and filter. The TX-to-RX self-interference is suppressed by 33 dB with a 50-channel separation, 28.4 dB with a 30 channel separation and 27.3 dB for a 10 channel separation between TX and RX.

Figure 13:
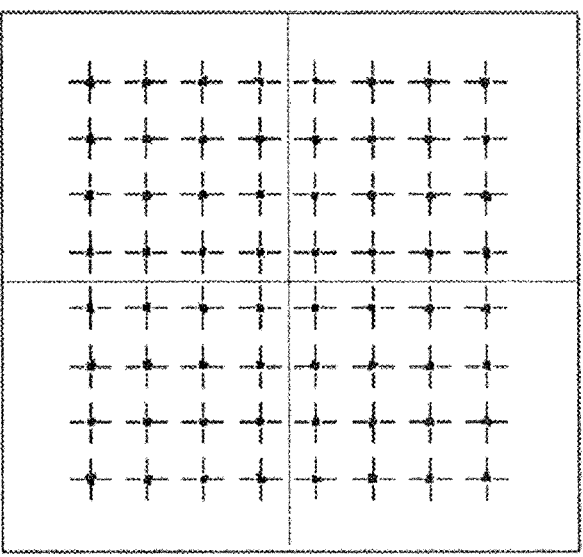
FIG. 13 is a diagram illustrating an example quadrature amplitude modulation (QAM) constellation, in accordance with one or more aspects of the present disclosure.
Figures 14A, 14B, 14C, 14D, 14E, 14F:
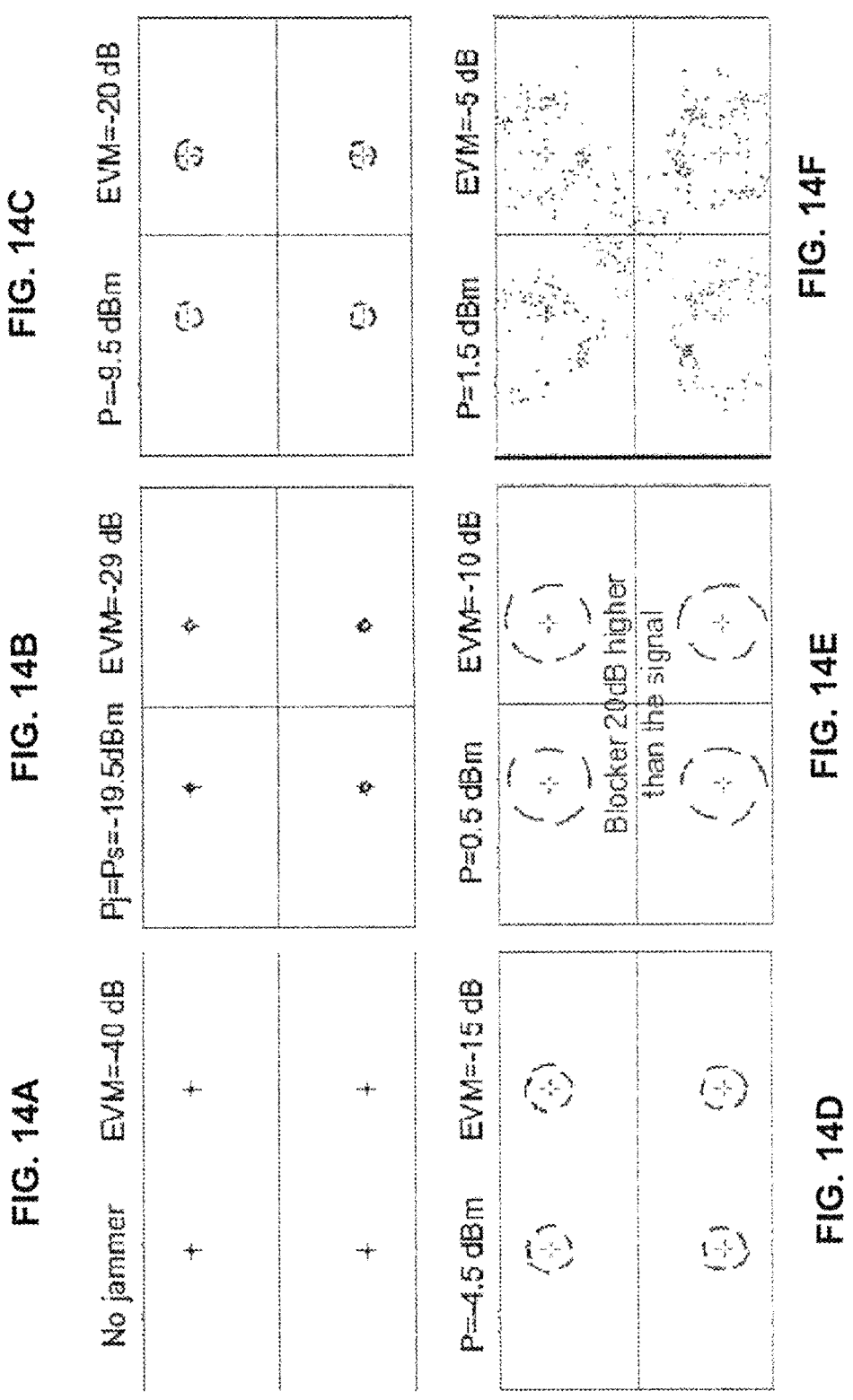
FIGS. 14A-14F are diagrams illustrating examples of measured jammer performance, in accordance with one or more aspects of the present disclosure.

The overall system is configured to be a transmitter and receiver pair. The output of the transmitter correlator is fed via an amplifier and attenuator such that a −19.5 dBm signal was fed to the correlator inputs. Both correlators may be driven by a common random 100 channel frequency hopped LO with a hop-rate of 50 MHops/s. In this case, there is full synchronization between the transmitter and receiver except for any delay through the low-noise amplifier (LNA), cables and attenuator. The measured 64-quadrature-amplitude modulation (QAM) received data constellation is shown in FIG. 13. The measured EVM was −38 dB. For an example chip microphotograph, the total active area is 3.1 mm², and the total power consumption is 24 mW for receive and for transmit from a 1V power supply.

In some examples, an in-band jammer is added to the receiver input to measure its blocker handling performance. A quadrature phase shift keying (QPSK) signal is generated at the transmitter, and the constellation of the received signal is measured at the receiver in the presence of a narrow-band in-band continuous wave (CW) jammer. The amplitude of the jammer is then varied to see the effect on the constellation. QPSK modulation is chosen for visual clarity.

FIGS. 14A-14F shows the RX measured constellation and error vector magnitude (EVM) for different jammer powers. As can been seen, the receiver can successfully demodulate received symbols even when an in-band jammer is present and is up to 20 dB larger than the desired signal. This is a direct consequence of the 20 dB processing gain that is realized directly at RF by the fast frequency hopped correlators.

Table I shows various design characteristics and features of example embodiments of the present disclosure. The techniques described herein may provide a frequency hopped system with processing gain and the only frequency hopped system with processing gain at radio frequencies. This system has a hopping speed that is, e.g., 300X faster than prior frequency hopped systems. The data rate also is roughly, e.g., 3 times faster.

Thus, a new, ultra-fast hopping transceiver front-end architecture is described herein that provides, e.g., 20 dB of processing gain for the first time. All the signal processing is performed in, e.g., the radio frequency domain in order to suppress any in-band interfering signals before they reach the first amplification stage in the receiver chain. The design does not rely on-any a priori knowledge for jammer suppression and can suppress one or more jammers by 20 dB. The system has the highest frequency hop-rate in comparison to the state of the art and, in various examples, only consumes, e.g., 24 mW for RX and 24 mW for the TX for a total of 48 mW for the transceiver frontend.

TABLE I

| Method | Fast Hopping |
|---|---|
| RF processing gain (dB) | 20 |
| Hopping speed (Mhops/s) | 50 |
| N-of hops/symbol | 100 |
| Center frequency (MHz) | 400-1000 |
| Power(mW) (TX = RX) | 24 |
| RF TX SIC (dB) | 33 |

Figure 15:
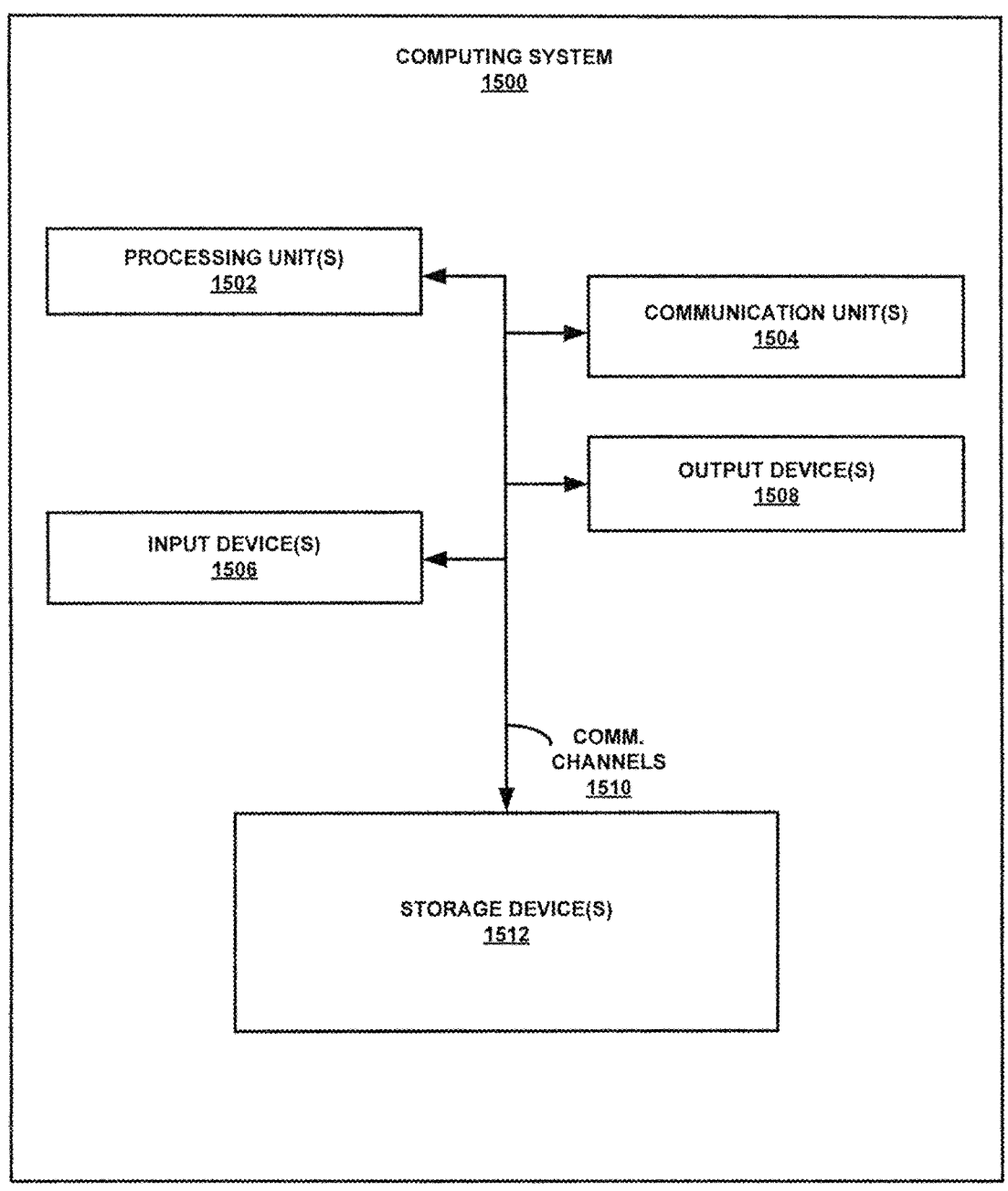
FIG. 15 is a block diagram illustrating an example computing system, in accordance with one or more aspects of the present disclosure.

FIG. 15 is a block diagram illustrating details of an example computing system 1500, such as system that may include or be included in transceiver 100 and/or additional processing elements 116, in accordance with one or more aspects of the present disclosure. FIG. 15 illustrates only one particular example of computing system 1500, and many other examples of computing system 1500 may be used in other instances and may include a subset of the components shown, or may include additional components not shown, in FIG. 15. In some examples, computing system 1500 may comprise or be included in a mobile computing system or device.

As shown in the example of FIG. 15, computing system 1500 includes one or more processing units 1502, one or more input devices 1506, one or more communication units 1504, one or more output devices 1508, and one or more storage devices 1512. Communication channels 1510 may interconnect each of the components 1502, 1504, 1506, 1508, 1512 for inter-component communications (physically, communicatively, and/or operatively). In some examples, communication channels 1510 may include a system bus, a network connection, an inter-process communication data structure, or any other method for communicating data between hardware and/or software.

One or more input devices 1506 of computing system 1500 may receive input. Examples of input are tactile, audio, and video input. Examples of input devices 1506 include a presence-sensitive screen, touch-sensitive screen, mouse, keyboard, voice responsive system, video camera, microphone or any other type of device for detecting input from a human or machine.

One or more output devices 1508 of computing system 1500 may generate output. Examples of output are tactile, audio, and video output. Examples of output devices 1508 include a presence-sensitive screen, sound card, video graphics adapter card, speaker, cathode ray tube (CRT) monitor, liquid crystal display (LCD), or any other type of device for generating output to a human or machine. Output devices 1508 may include display devices such as cathode ray tube (CRT) monitor, liquid crystal display (LCD), or any other type of device for generating tactile, audio, and/or visual output.

One or more communication units 1504 of computing system 1500 may communicate with one or more other computing systems or devices via one or more networks by transmitting and/or receiving network signals on the one or more networks. Examples of communication units 1504 include a network interface card (e.g. such as an Ethernet card), an optical transceiver, a radio frequency transceiver, or any other type of device that can send and/or receive information, such as through a wired or wireless network. Other examples of communication units 1504 may include short wave radios, cellular data radios, wireless Ethernet network radios, as well as universal serial bus (USB) controllers. Communication units 1504 may include one or more of the receivers, transmitters, transceivers, oscillators, correlators, and/or other circuitry described herein and illustrated in one or more of the previous figures.

One or more storage devices 1512 within computing system 1500 may store information for processing during operation of computing system 1500 (e.g., computing system 1500 may store data accessed by one or more modules, processes, applications, or the like during execution at computing system 1500). In some examples, storage devices 1512 on computing system 1500 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. In some cases, storage devices 1512 may include redundant array of independent disks (RAID) configurations and one or more solid-state drives (SSD's).

Storage devices 1512, in some examples, also include one or more computer-readable storage media. Storage devices 1512 may be configured to store larger amounts of information than volatile memory. Storage devices 1512 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 1512 may store program instructions and/or data associated with one or more software/firmware elements or modules.

Computing system 1500 further includes one or more processing units 1502 that may implement functionality and/or execute instructions within computing system 1500. For example, processing units 1502 may receive and execute instructions stored by storage devices 1512 that execute the functionality of the elements and/or modules described herein. These instructions executed by processing units 1502 may cause computing system 1500 to store information within storage devices 1512 during program execution. Processing units 1502 may also comprise circuitry to implement one or more of the receivers, transmitters, transceivers, oscillators, correlators, and/or other circuitry described herein and illustrated in one or more of the previous figures.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise random-access memory (RAM), read-only memory (ROM), electrically erasable programmable read-only memory (EEPROM), compact disc read-only memory (CD-ROM), or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc, laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSP's), general purpose microprocessors, application specific integrated circuits (ASIC's), field programmable logic arrays (FPGA's), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of IC's (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A frequency hopping transceiver, comprising:
one or more antennas that are configured to receive and transmit wireless signals;
a transmitter digital oscillator that is configured to provide transmitter oscillation signals at one or more frequencies as a function of a transmit hopping code;
transmitter correlation circuitry that is communicatively coupled to the transmitter digital oscillator and to the one or more antennas, wherein the transmitter correlation circuitry is configured to spread, based on the transmitter oscillation signals, one or more transmit signals over a plurality of transmit channels to create frequency-hopped transmit signals that are provided to the one or more antennas;
a receiver digital oscillator that is configured to provide receiver oscillation signals at one or more frequencies as a function of a receive hopping code, wherein the receive hopping code is orthogonal to the transmit hopping code; and
receiver correlation circuitry that is communicatively coupled to the receiver digital oscillator and to the one or more antennas, wherein the receiver correlation circuitry is configured to:
de-spread one or more frequency-hopped data signals included in incoming wireless signals received by the one or more antennas to generate de-spread data signals, wherein the incoming wireless signals further include one or more narrow-band interference signals;
spread, based on the receiver oscillation signals, the one or more narrow-band interference signals over a plurality of receive channels to create frequency-hopped interference signals, wherein the plurality of receive channels are orthogonal to the plurality of transmit channels; and
filter out the frequency-hopped interference signals from the de-spread data signals.

2. The frequency hopping transceiver of claim 1, wherein the one or more narrow-band interference signals comprise one or more in-band jamming signals, and wherein the receiver correlation circuitry is configured to filter out the frequency-hopped interference signals at least by suppressing the one or more in-band jamming signals.

3. The frequency hopping transceiver of claim 1, wherein the transmitter digital oscillator comprises transmission digital oscillation circuitry that includes exactly one digital multiplier, exactly one digital adder, and exactly two registers, the transmit hopping code being provided as input to the exactly one digital multiplier of the transmission digital oscillation circuitry, and
wherein the receiver digital oscillator comprises receiver digital oscillation circuitry that includes exactly one digital multiplier, exactly one digital adder, and exactly two registers, the receive hopping code being provided as input to the exactly one digital multiplier of the receiver digital oscillation circuitry.

4. The frequency hopping transceiver of claim 3, further comprising:
a first digital-to-analog converter (DAC) that is configured to convert the transmitter oscillation signals from the transmitter digital oscillator into transmitter analog oscillation signals;
a second DAC that is configured to convert the receiver oscillation signals from the receiver digital oscillator into receiver analog oscillation signals;
a first injection-locked oscillator communicatively coupled to the first DAC, wherein the first injection-locked oscillator functions as a first bandpass filter with respect to the transmitter analog oscillation signals; and
a second injection-locked oscillator communicatively coupled to the second DAC, wherein the second injection-locked oscillator functions as a second bandpass filter with respect to the receiver analog oscillation signals.

5. The frequency hopping transceiver of claim 3, wherein the transmitter digital oscillator provides the transmitter oscillation signals at the one or more frequencies in a range from 0 to fst/2 based on the transmit hopping code, where fst is a sampling clock frequency for the transmission digital oscillation circuitry, and wherein the receiver digital oscillator provides the receiver oscillation signals at the one or more frequencies in a range from 0 to fsr/2 based on the receive hopping code, where fsr is a sampling clock frequency for the receiver digital oscillation circuitry.

6. The frequency hopping transceiver of claim 1, further comprising:

band selection circuitry that is communicatively coupled to the one or more antennas, wherein the band selection circuitry is configured to suppress at least a portion of out-of-band interference outside of a defined bandwidth for the incoming wireless signals received by the one or more antennas.

7. The frequency hopping transceiver of claim 1, wherein the receiver correlation circuitry comprises first N-path switch-capacitor circuitry, wherein the transmitter correlation circuitry comprises second N-path switch-capacitor circuitry, and wherein N is an integer greater than 1.

8. The frequency hopping transceiver of claim 1, further comprising self-interference cancellation circuitry that is communicatively coupled to the transmitter correlation circuitry and also to the receiver correlation circuitry, wherein the self-interference cancellation circuitry is configured to suppress transmit channel interference on one or more channels of the plurality of transmit channels at least by performing narrow-band flat fading per each of the one or more channels.

9. The frequency hopping transceiver of claim 8, further comprising:

a power amplifier;

a directional coupler that is communicatively coupled to the power amplifier and to the self-interference cancellation circuitry; and an analog-to-digital converter communicatively coupled to the directional coupler, wherein the analog-to-digital converter is included in an auxiliary path that is configured to suppress broadband noise signals that are output from the power amplifier.

10. A frequency hopping receiver, comprising:

one or more antennas that are configured to receive incoming wireless signals that include one or more frequency-hopped data signals and one or more narrow-band interference signals;

a receiver digital oscillator that is configured to provide receiver oscillation signals at one or more frequencies as a function of a receive hopping code; and receiver correlation circuitry that is communicatively coupled to the receiver digital oscillator and to the one or more antennas, wherein the receiver correlation circuitry is configured to:

de-spread the one or more frequency-hopped data signals to generate de-spread data signals;

spread, based on the receiver oscillation signals, the one or more narrow-band interference signals over a plurality of receive channels to create frequency-hopped interference signals; and filter out the frequency-hopped interference signals from the de-spread data signals.

11. The frequency hopping receiver of claim 10, wherein the one or more narrow-band interference signals comprise one or more in-band jamming signals, and wherein the receiver correlation circuitry is configured to filter out the frequency-hopped interference signals at least by suppressing the one or more in-band jamming signals.

12. The frequency hopping receiver of claim 10, wherein the receiver digital oscillator comprises receiver digital oscillation circuitry that includes exactly one digital multiplier, exactly one digital adder, and exactly two registers, the receive hopping code being provided as input to the exactly one digital multiplier of the receiver digital oscillation circuitry.

13. The frequency hopping receiver of claim 12, further comprising:

a digital-to-analog converter (DAC) that is configured to convert the receiver oscillation signals from the receiver digital oscillator into receiver analog oscillation signals; and an injection-locked oscillator communicatively coupled to the DAC, wherein the injection-locked oscillator functions as a bandpass filter with respect to the receiver analog oscillation signals.

14. A method of providing in-band rejection of interference signals, the method comprising:

receiving, by one or more antennas, incoming wireless signals that include one or more frequency-hopped data signals and one or more narrow-band interference signals;

providing, by a receiver digital oscillator, receiver oscillation signals at one or more frequencies as a function of a receive hopping code;

receiving, by receiver correlation circuitry that is communicatively coupled to the receiver digital oscillator and to the one or more antennas, the receiver oscillation signals provided by the receiver digital oscillator;

de-spreading the one or more frequency-hopped data signals to generate de-spread data signals;

spreading, based on the receiver oscillation signals, the one or more narrow-band interference signals over a plurality of receive channels to create frequency-hopped interference signals; and filtering out the frequency-hopped interference signals from the de-spread data signals.

15. The method of claim 14, wherein de-spreading the one or more frequency-hopped data signals comprises providing a processing gain to the one or more frequency-hopped data signals.

16. The method of claim 14, wherein the one or more narrow-band interference signals comprise one or more in-band jamming signals, and wherein filtering out the frequency-hopped interference signals comprises suppressing the one or more in-band jamming signals.

17. The method of claim 14, wherein the receiver digital oscillator comprises receiver digital oscillation circuitry that includes exactly one digital multiplier, exactly one digital adder, and exactly two registers, the receive hopping code being provided as input to the exactly one digital multiplier of the receiver digital oscillation circuitry.

18. The method of claim 14, further comprising:

converting, by a digital-to-analog converter (DAC), the receiver oscillation signals from the receiver digital oscillator into receiver analog oscillation signals; and implementing, by an injection-locked oscillator communicatively coupled to the DAC, a bandpass filter with respect to the receiver analog oscillation signals.

19. The method of claim 14, further comprising:

suppressing, by band selection circuitry that is communicatively coupled to the one or more antennas, at least a portion of out-of-band interference outside of a defined bandwidth for the incoming wireless signals.

20. The method of claim 14, further comprising:

suppressing, by self-interference cancellation circuitry that is communicatively coupled to transmitter correlation circuitry and also to the receiver correlation circuitry, transmit channel interference on one or more channels of a plurality of transmit channels at least by performing narrow-band flat fading per each of the one or more channels.

\* \* \* \* \*